United States Patent
Ouchi

(10) Patent No.: US 8,145,828 B2
(45) Date of Patent: Mar. 27, 2012

(54) FLASH MEMORY-MOUNTED STORAGE APPARATUS

(75) Inventor: Katsumi Ouchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 721 days.

(21) Appl. No.: 12/286,000

(22) Filed: Oct. 17, 2008

(65) Prior Publication Data

US 2010/0049905 A1 Feb. 25, 2010

(30) Foreign Application Priority Data

Aug. 25, 2008 (JP) ................... 2008-214807

(51) Int. Cl.
*G06F 12/00* (2006.01)
*G06F 13/00* (2006.01)
*G06F 13/28* (2006.01)
(52) U.S. Cl. .......... 711/103; 711/E12.001; 711/E12.008
(58) Field of Classification Search ............ 711/103, 711/E12.001, E12.008
See application file for complete search history.

(56) References Cited

U.S. PATENT DOCUMENTS

| | | | |
|---|---|---|---|
| 7,793,059 B2 * | 9/2010 | Cornwell et al. | 711/157 |
| 2007/0055821 A1 * | 3/2007 | Ootsuka et al. | 711/115 |
| 2007/0168625 A1 | 7/2007 | Cornwell et al. | |
| 2007/0233931 A1 | 10/2007 | Tanaka et al. | |
| 2010/0332741 A1 * | 12/2010 | Cornwell et al. | 711/103 |

FOREIGN PATENT DOCUMENTS

| | | |
|---|---|---|
| JP | 2007-265265 | 3/2006 |
| JP | 2007-193810 | 1/2007 |

* cited by examiner

*Primary Examiner* — Sheng-Jen Tsai
(74) *Attorney, Agent, or Firm* — Stites & Harbison, PLLC; Juan Carlos A. Marquez, Esq.

(57) ABSTRACT

In a data center, there is a limit in power capacity supplied to a storage apparatus, and the rated power consumption of the storage apparatus may exceed the power supply capacity by addition of storage capacity. A storage apparatus according to the invention includes one or plural packages mounting plural flash memories and a circuit controlling the flash memories as well as information of power supply capacity. The number of flash memories performing writing, erasing or reading at the same time is designated with respect to each package based on the information of power supply capacity.

10 Claims, 21 Drawing Sheets

FIG.2

FM PACKAGE COMPONENTS POWER CONSUMPTION MANAGEMENT TABLE

| FM PACKAGE COMPONENTS | RATED POWER CONSUMPTION |
|---|---|
| FLASH MEMORY A | 99 mW |
| FLASH MEMORY B | 120 mW |
| FLASH MEMORY CONTROL UNIT, OTHERS | 600 mW |

FIG.3

STORAGE APPARATUS COMPONENTS POWER CONSUMPTION MANAGEMENT TABLE

| STORAGE APPARATUS COMPONENTS | RATED POWER CONSUMPTION | NUMBER OF PIECES |
|---|---|---|
| SYSTEM CONTROLLER UNIT | 500 W | 1 |
| MEDIA CHASSIS (OTHER THAN FM PACKAGE) | 200 W | 1 |

FIG.4

POWER SUPPLY CAPACITY MANAGEMENT TABLE

| POWER SUPPLY CAPACITY |
|---|
| 1000 W |

FIG.5

FLASH MEMORY CONFIGURATION MANAGEMENT TABLE

| FM PACKAGE NUMBER | KIND OF MOUNTED FLASH MEMORIES | NUMBER OF MOUNTED FLASH MEMORIES |
|---|---|---|
| #1 | A | 16 |
| #2 | A | 16 |
| #3 | A | 16 |
| #4 | A | 16 |
| #5 | A | 16 |
| #6 | A | 16 |
| #7 | A | 16 |
| #8 | A | 16 |
| #9 | A | 16 |
| #10 | A | 16 |
| #11 | A | 32 |
| #12 | A | 32 |
| ⋮ | ⋮ | ⋮ |

RAID GROUP MANAGEMENT TABLE

| RAID GROUP NUMBER | RAID LEVEL | RAID GROUP STORAGE CAPACITY | RAID GROUP CONFIGURATION FM PACKAGE NUMBER | CONFIGURATION LU NUMBER |
|---|---|---|---|---|
| RG#1 | 5 | 196GB | #1,#2,#3,#4 | LU#1,LU#5 |
| ⋮ | ⋮ | ⋮ | ⋮ | ⋮ |

FIG.10

FM PACKAGE LOGICAL ADDRESS CONVERSION TABLE

| FM PACKAGE LOGICAL ADDRESS | FLASH MEMORY NUMBER | PAGE ADDRESS | PHYSICAL ADDRESS IN PAGE |
|---|---|---|---|
| 0 | 0 | 0 | 0 |
| 1 | 0 | 0 | 1 |
| 2 | 0 | 0 | 2 |
| 3 | 0 | 0 | 3 |
| 4 | 1 | 0 | 0 |
| 5 | 1 | 0 | 1 |
| 6 | 1 | 0 | 2 |
| 7 | 1 | 0 | 3 |
| 8 | 2 | 0 | 0 |
| 9 | 2 | 0 | 1 |
| 10 | 2 | 0 | 2 |
| 11 | 2 | 0 | 3 |
| ⋮ | ⋮ | ⋮ | ⋮ |

FIG.17

LU LOGICAL ADDRESS CONVERSION TABLE

| LU NUMBER | LU LOGICAL ADDRESS | DATA STORAGE FM PACKAGE NUMBER | DATA STORAGE FM PACKAGE LOGICAL ADDRESS | PARITY STORAGE FM PACKAGE NUMBER | PARITY STORAGE FM PACKAGE LOGICAL ADDRESS |
|---|---|---|---|---|---|
| LU #1 | 0 | #1 | 0 | #4 | 0 |
| LU #1 | 1 | #2 | 0 | #4 | 0 |
| LU #1 | 2 | #3 | 0 | #4 | 0 |
| LU #1 | 3 | #4 | 1 | #3 | 1 |
| ... | ... | ... | ... | ... | ... |
| LU #2 | 0 | #5 | 0 | #8 | 0 |
| ... | ... | ... | ... | ... | ... |

US 8,145,828 B2

FLASH MEMORY-MOUNTED STORAGE APPARATUS

CROSS REFERENCES TO RELATED APPLICATIONS

This application relates to and claims priority from Japanese Patent Application No. 2008-214807, filed on Aug. 25, 2008, the entire disclosure of which is incorporated herein by reference.

BACKGROUND OF THE INVENTION

1. Field of the Invention

The invention relates to a storage apparatus on which flash memories are mounted as storage media, particularly, relates to a storage apparatus which improves availability.

2. Description of the Related Art

In related art, mounting of hard disk drives (hereinafter, HDDs) was the mainstream as storage media for a storage apparatus such as a disk array. In recent years, the bit cost of a flash memory which is a non-volatile semiconductor memory is reducing, and applications of which are expanded from a memory card to a solid-state drive (SSD) having the same I/F as the HDD. The flash memory is excellent in power consumption at the time of idling, random-access performance, and vibration resistance as compared with the HDD. Therefore, it is expected in the future that the flash memory will be applied as a storage medium in a performance-oriented storage apparatus or a power saving-oriented storage apparatus.

Though the flash memory has the above characteristics, there are constraints in use such that there is a limit in the number of times of erasing a block as a unit of a storage area. Accordingly, as related art concerning a storage apparatus using a flash memory as a storage medium, for example, there is one in which the number of times of erasing blocks is equalized over plural flash memories (for example, JP-A-2007-265265 (Patent Document 1)).

In a system on which flash memories are mounted, plural flash memories are usually operated in parallel in order to improve performance. Therefore, the more the number of flash memories operated in parallel becomes, the more the power consumption increases. Accordingly, there is a technique in which the number of flash memories operated in parallel is selected (for example, JP-A-2007-193810 (Patent Document 2)).

[Patent Document 1] JP-A-2007-265265
[Patent Document 2] JP-A-2007-193810

SUMMARY OF THE INVENTION

In a collocation service as one of services of a data center, the power capacity is allocated to spaces such as in a unit of a rack. Even in the case that power supply capacity is sufficient with respect to power consumption and there is no problem in a design at the time of introducing a storage apparatus, the power consumption of the storage apparatus may exceed the availability of the power supply with the addition of the storage capacity. Further, another IT device may be added to the same power supply. On the other hand, power equipment of the data center is not designed for addition, therefore, it is generally difficult to increase the power supply capacity.

When a storage apparatus applying flash memories as storage media is used in a state in which the maximum rated power consumption exceeds the power supply capacity, the supply voltage is dropped and there is a danger that access to flash memories is not normally completed, as a result, data may be damaged.

An object of the invention is to solve the above problems in related arts and to realize a storage apparatus which maintains availability when the maximum rated power consumption exceeds the ability of power supply.

A typical invention disclosed in the present application is as follows. A storage apparatus including plural flash memories, a flash memory control unit controlling the plural flash memories, a storage control unit and a storage unit storing information of power supply capacity, in which the storage control unit determines the number of parallel-processable flash memories performing writing, erasing or reading in parallel based on the stored information of power supply capacity.

According to an embodiment of the invention, in a storage apparatus on which flash memories are mounted as storage media, the storage apparatus which maintains availability even when power supply is insufficient can be realized.

BRIEF DESCRIPTION OF THE DRAWINGS

FIG. 2 is an example of a chart showing rated power consumption of FM package components;

FIG. 3 is an example of a chart showing rated power consumption of constant operation units in the storage apparatus;

FIG. 4 is an example of a chart showing the power supply capacity;

FIG. 5 is an example of a chart showing a configuration of mounted flash memories;

FIG. 10 is an example of a FM package logical address conversion table;

FIG. 17 is an example of an LU logical address conversion table;

DESCRIPTION OF THE PREFERRED EMBODIMENTS

Hereinafter, embodiments of the invention will be explained with reference to the drawings.

First Embodiment

Figure 1:
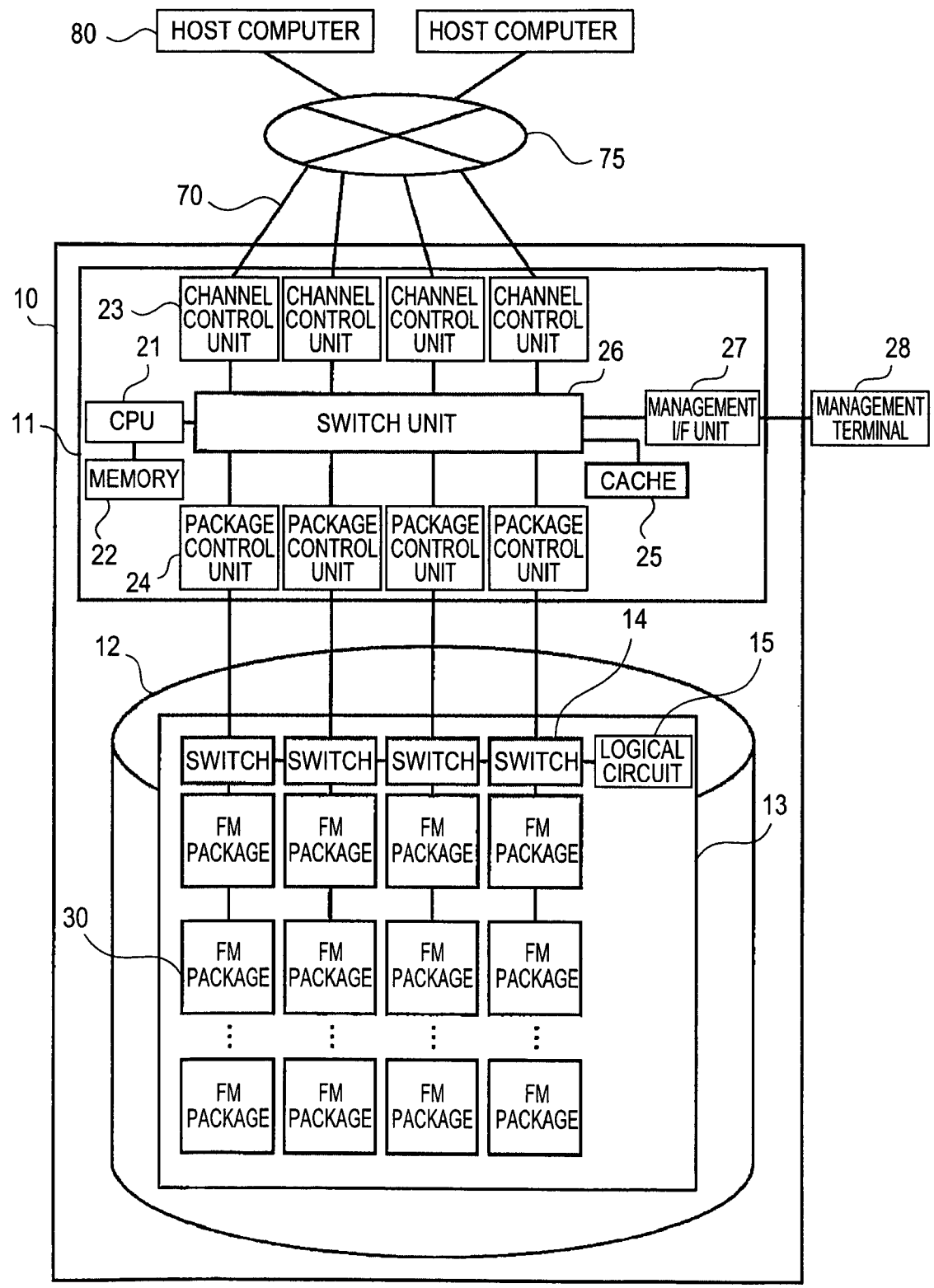
FIG. 1 is an example of a configuration diagram of a storage apparatus.

FIG. 1 is a configuration view of a storage apparatus 10 according to a first embodiment of the invention. The storage apparatus 10 is connected to a host computer 80 through a host interface 70 and a network 75. The host computer 80 requests the storage apparatus 10 to input and output data. The storage apparatus 10 includes a system controller unit 11 and a media chassis 12.

The system controller unit 11 includes a CPU 21, a local memory 22, a cache memory 25, a channel control unit 23, a FM package control unit 24, a switch unit 26 and a management I/F unit 27.

The CPU 21 is a processor which executes programs stored in the local memory 22 and controls respective components in the system controller unit 11 and the media chassis 12. The CPU 21 can control input and output processing of data to flash memories included in the media chassis 12, for example, in response to input and output of data requested from the host computer 80.

The local memory 22 stores programs executed by the CPU 21 and various types of databases. It is noted that programs and data stored in the flash memories are copied to the local memory 22 if necessary. In addition, the local memory 22 manages information inputted by a management terminal 28 connected to the management I/F unit 27 as shown in, for example, FIG. 2, FIG. 3, FIG. 4 and FIG. 5. FIG. 2 to FIG. 5 will be described later.

The cache memory 25 is a storage area temporally storing writing data inputted from the host computer 80 to the storage apparatus 10 and reading data outputted from the storage apparatus 10 to the host computer 80. The cache memory 25 may be formed by, for example, a non-volatile memory or a volatile memory which is backed up by a battery. When the cache memory 25 is formed by a non-volatile memory, the cache memory 25 can hold stored cache data even when the power is shut off. When the cache memory 25 is formed by a volatile memory backed up by a battery, the cache memory 25 can hold stored cache data just for a period of time according to the battery capacity even when the power is shut off.

The channel control unit 23 is an interface connected to the host computer 80, receiving input and output requests of data from the host computer 80 (for example, input and output requests in blocks or input and output request in files). The FM package control unit 24 is an interface connected to a FM package 30, performing input and output request of data to the FM package 30 using a prescribed protocol, for example, PCI Express protocol. The switch unit 26 controls data transfer paths between the host computers 80 and FM packages 30 based on an instruction by the CPU 21.

A power source module is provided in the system controller unit 11 though not shown, converting AC voltage supplied from the outside of the storage apparatus 10 into DC voltage. The DC voltage is converted into further lower voltage if necessary, which is supplied to respective components in the system controller unit 11.

One or plural FM packages 30 are mounted on the media chassis 12. The FM package 30 is a storage medium storing programs, user data and the like, including a PCI Express interface as an external interface. The form of the interface is not limited to this, and may be, for example, FC (Fibre Channel), SAS (Serial Attached SCSI) which are applied to HDD, or SATA (Serial Advanced Technology Attachment). The FM package 30 includes dual input and output ports for improving availability and may be connected to two FM package control units 24, respectively.

Each FM package 30 is connected to a backplane board 13 by a connector. The FM package 30 is connected to the FM package control unit 24 through a PCI Express switch 14 on the backplane board 13. The FM package 30 can be inserted and ejected with respect to the media chassis 12, and the media chassis 12 includes one or plural slots for mounting the FM package 30. It is not necessary to mount the FM packages 30 to all slots of the media chassis 12, and it is possible to add the FM package 30 later for adding the storage capacity or adding an alternate block area of a flash memory. A logical circuit 15 on the backplane board 13 has position information of the FM packages 30 mounted on the media chassis 12 by an internal register. When the FM package 30 is inserted in each slot, a package detection signal prepared for every slot is inverted, which inverts a bit value corresponding to the slot in the internal register. When the register value is changed, the logical circuit 15 issues an interrupt signal with respect to the CPU 21 through the package control unit 24. The logical circuit 15 issues an interrupt signal with respect to the CPU 21 not only when the FM package 30 is added but also when the FM package 30 is cut. The CPU 21 can know slot positions and the number of the mounted FM packages 30 by reading out register information in the logical circuit 15 through the switch 14. According to this, hot swap of the FM packages 30 with respect to the media chassis 12 becomes possible.

Figures 6, 7:
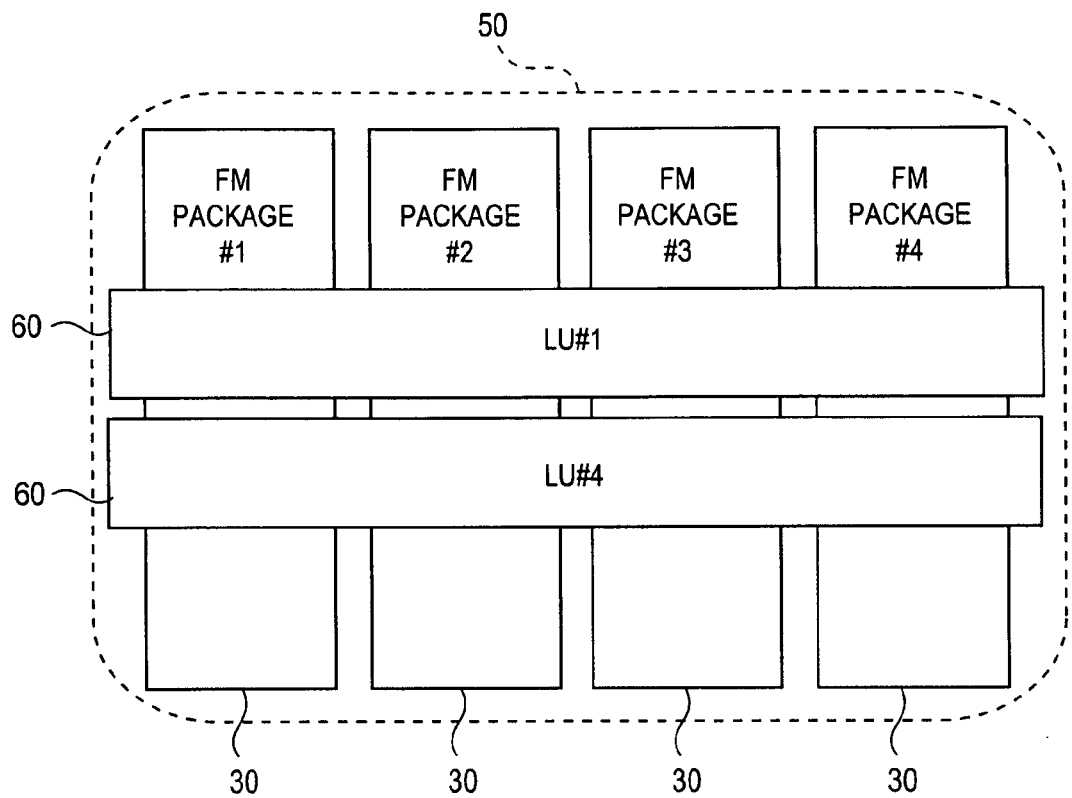
FIG. 6 is an example of a RAID group and an LU configuration.
FIG. 7 is an example of a RAID configuration management table.

The media chassis 12 includes one or plural RAID groups configured by plural FM packages 30. For example, as shown in FIG. 6, a RAID group 50 is configured by grouping, for example, four FM packages 30 in a RAID level 5 (3D+1P). The RAID group 50 is configured based on an instruction by the storage management terminal 28 connected to the storage apparatus 10. Furthermore, the media chassis 12 includes one or plural auxiliary FM packages 30 as FM packages for spares to be used when failures occur. The storage apparatus 10 has redundancy by the RAID group, thereby reliability with respect to failures is improved. For example, when a failure occurs at a certain FM package 30 and it becomes difficult to access the FM package 30 from the host computer 80, the CPU 21 recovers user data and parity data of the FM package 30 in which the failure occurs in a spare FM package by a correction copy based on user data and parity data stored in the other FM packages 30 belonging to the same RAID group 50. A case in which the media chassis 12 includes plural RAID groups of the RAID level 5 will be explained as follows. The mounting of flash memories in the media chassis 12 is not limited to a package form. For example, it may be a form including the same shape and interface as the HDD. It is also preferable that the media chassis 12 mounts plural flash memories and later-described one or plural flash memory control units not through the form of the package or the drive.

On the RAID group 50, one or plural logical volumes 60 (hereinafter, LU) are configured. In the example shown in FIG. 6, the LUs 60 having a LU number #1 and a LU number #4 are configured. The host computer 80 performs transmission and reception of data between the host computer 80 and the storage apparatus 10 by designating a LU number and a logical address in the LU. The local memory 22 includes a RAID configuration management table indicating correspondence between the LU and the RAID group as shown in FIG. 7. The local memory 22 further includes a LU logical address conversion table for converting a logical address of the LU into a logical address of the FM package as shown in FIG. 17, which is generated from the RAID configuration management table of FIG. 7.

A power source module is mounted on the media chassis 12 though not shown, converting AC voltage supplied from the outside of the storage apparatus into DC voltage. The DC voltage generates voltage to be supplied to the FM package 30 by a voltage regulator IC on the backplane board 13.

The storage apparatus 10 is provided with one system controller unit 11 in the example shown in FIG. 1, however, it is also preferable that the apparatus is provided with plural system controller units 11. The storage apparatus 10 is provided with one media chassis 12, however, it is also preferable that the apparatus is provided with plural media chassis 12. In addition, the storage apparatus 10 may be configured by one unit in which the system controller unit 11 and the media chassis 12 are incorporated.

Figure 8:
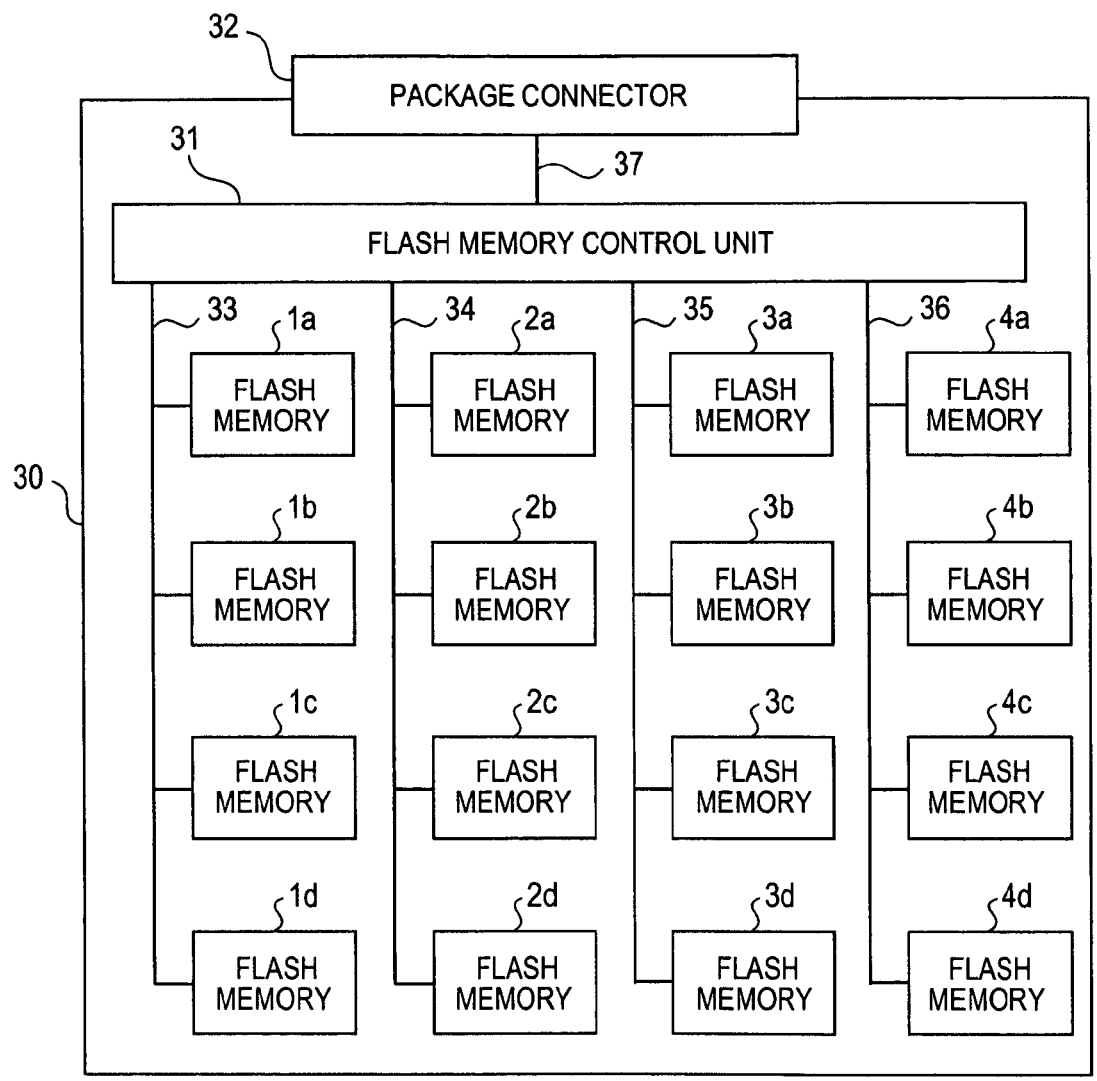
FIG. 8 is an example of an internal block diagram of a FM package.

FIG. 8 is an example of an internal block diagram of the FM package 30 according to the first embodiment of the invention. One flash memory control unit 31 and sixteen flash memories (1a to 4d) in the embodiment are mounded on a printed board (not shown). The number of flash memories is not limited to sixteen. The flash memories 1a, 1b, 1c and 1d are connected to the flash memory control unit 31 by a bath 33. Similarly, the flash memories 2a to 4d are connected to the flash memory control unit by buses 34, 35, and 36. In the embodiment, the case that the number of buses is four is explained, however, it is preferable that all flash memories in the FM package 30 are connected to one bus or that one flash memory is connected to one bus. The bus 33 includes flash memory control signals other than a flash memory selection signal and a ready/busy signal, and a data bus. The flash memory control unit 31 controls flash memories. The flash memory control unit 31 is configured by, for example, ASIC or FPGA, including a CPU including firmware. 37 denotes an external I/F, for example, a PCI Express interface. The flash memory selection signal and the ready/busy signal (not shown) are prepared for respective flash memories, which are connected between the flash memories and the flash memory control unit 31 individually. The flash memory control unit 31 selects a flash memory to be accessed by allowing the flash memory selection signal (not shown) to be active. A busy state (for example, Low level) of the ready/busy signal of the flash memory notifies the flash memory control unit 31 that the target flash memory is during writing, during reading or during erasing. 32 denotes a connector, which is used for connecting to the switch 14 on the backplane board 13 in the media chassis 12.

Figure 9:
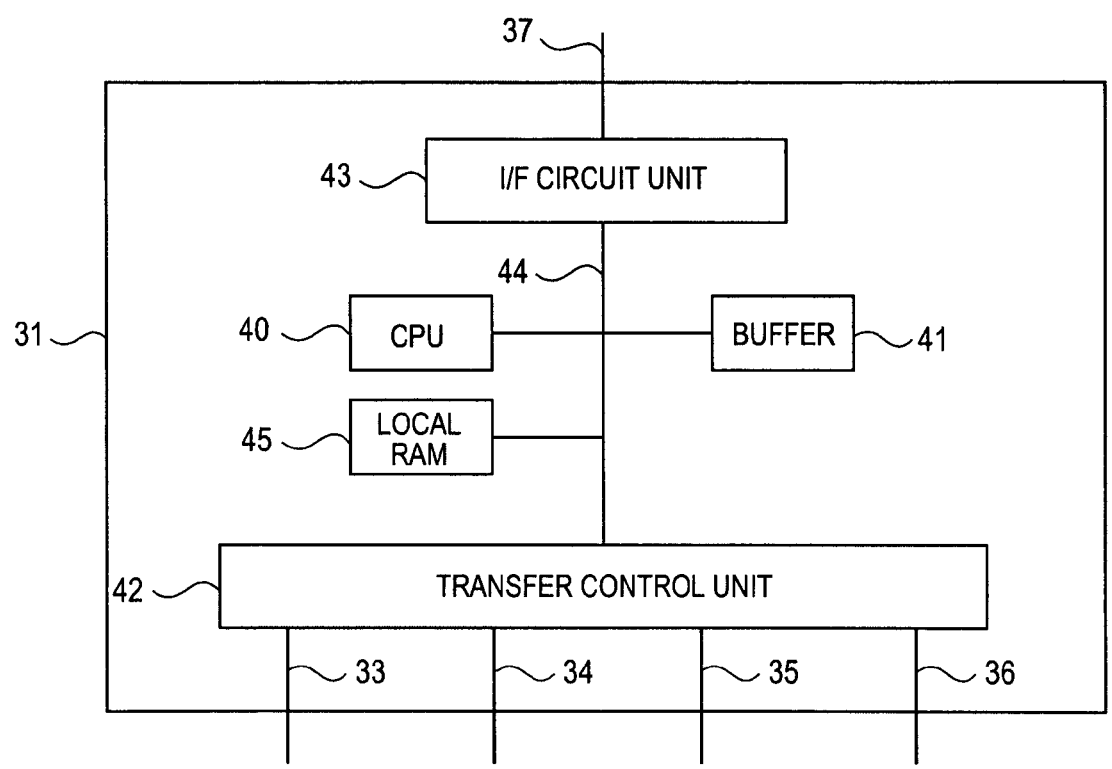
FIG. 9 is an example of an internal block diagram of a flash memory control unit in the FM package.

A block diagram of the flash memory control unit 31 is shown in FIG. 9. A buffer 41 is a storage area used for temporarily storing writing data or used when block data of the flash memory is temporarily escaped. The buffer 41 has the size whereby sixteen flash memories connected in the embodiment can be processed at the same time. A local RAM 45 stores programs executed by a CPU 40 and information of the kind or the number of mounted flash memories as described later. The local RAM 45 also stores information indicating correspondence between a logical address in the FM package 30 and a flash memory number in the FM package 30, a page address in the flash memory and a physical address in a page as a FM package logical address conversion table shown in FIG. 10. When the FM package 30 selected by the CPU 21 receives a write command or a read command from the system controller unit 11, the CPU 40 converts a FM package logical address received from the system controller unit 11 into a flash memory number, a page address in the flash memory and a physical address in the page to select a flash memory to be accessed by referring to the FM package logical address conversion table shown in FIG. 10. After that, the CPU 40 performs address and command transfer to an access-target flash memory and waits for processing which will be described later.

A transfer control unit 42 performs address and command transfer as well as data transmission and reception with respect to the flash memories connected to the buses 33 to 36 according to an instruction of the CPU 40. The transfer control unit 42 is mainly configured by a logical circuit, performs processing with respect to the flash memories connected to the bus 33 to 36 independently without affecting one another between busses by state machine circuits prepared for each bus according to an instruction by the CPU 40. An I/F circuit 43 is a circuit operated as an interface with respect to the package control unit 24 in the system controller unit 11 and configured by, for example, a PCI Express protocol chip. The CPU 40, the local RAM 45, the buffer 41, the transfer control unit 42 and the I/F circuit 43 are connected to one another by an internal bus 44.

When the power is applied to the storage apparatus 10, when information of the power supply capacity of FIG. 4 is changed, or when operation voltage is supplied to the FM package 30 by adding the FM package 30 to the media chassis 12, the CPU 40 of the flash memory control unit 31 collects ID data of the mounted flash memory as startup processing, and stores the kind and the number of the mounted flash memories in the local RAM 45. Specifically, the transfer control unit 42 issues an ID read command with respect to respective buses by sequentially allowing the flash memory selection signal to be active according to an instruction of the CPU 40. When the flash memory is connected, it is possible to read ID data, which is stored in the local RAM 45. The ID data can identify a vendor of the flash memory, the kind of the flash memory such as SLC/MLC, the memory capacity and the like by a code unique to the kind of the flash memory. The local memory 22 manages relationship between the ID data of the flash memory which may be mounted on the storage apparatus 10 and rated power consumption by a later-described FM package components power consumption management table of FIG. 2. According to the embodiment, the kind of the mounted flash memories in the FM package 30 is one kind. On the other hand, when it becomes necessary that the capacity is added, there is a case of adding the FM package on which the flash memory having larger capacity is mounted, therefore, there may be a case in which the kind of mounted flash memories is different between the FM packages 30.

FIG. 2 to FIG. 5 are charts for explaining information managed in the local memory 22. FIG. 2 shows the FM package components power consumption management table which manages rated power consumption concerning components of the FM package 30 included in the media chassis 12. Specifically, the table manages information of rated power consumption per one flash memory of flash memories (for example, 1a to 4d) which may be mounted on the FM package 30 and rated power consumption of the later-described flash memory control unit 31 and other components in the FM package 30. The rated power consumption per one flash memory (for example, one of 1*a* to 4*d*) is equivalent to at least any one of power consumption during write operation, during erasing operation or during read transfer. When plural kinds of flash memories are mounted inside the storage apparatus 10, rated power consumption is managed according to the kinds of the flash memories. The FM package components power consumption management table includes a not-shown reservation area, and when a new kind of flash memory is mounted, it is possible to additionally register the memory by the management terminal 28.

FIG. 3 shows a storage apparatus components power consumption management table which manages information of rated power consumption of the system controller unit 11 and rated power consumption of components other than the FM package 30 in the media chassis 12, which are constant operation units of the storage apparatus 10. FIG. 4 shows a power supply capacity management table which manages information of power capacity supplied to the storage apparatus 10. FIG. 5 shows a flash memory configuration management table including information of the kind and the number of flash memories mounted on each FM package 30. Information of FIG. 2 to FIG. 4 is managed by registering input information from the management terminal 28. The form of management is not limited to this. For example, it is also preferable that information of rated power consumption of the flash memory control unit 31 and other components in FIG. 2 is managed by each component. Concerning rated power consumption of the system controller unit 11 and rated power consumption of components other than the FM package 30 in the media chassis 12 of FIG. 3, it is preferable that information of rated power consumption is managed by decomposing into respective components, or, conversely, it is also preferable that information of adding rated power consumption of the system controller unit 11 to rated power consumption of components other than the FM package 30 in the media chassis 12 is managed. For example, concerning the power supply capacity of FIG. 4, it is preferable to manage information of power supply ability of a power breaker, or, more precisely, it is preferable to manage information obtained by subtracting information of power consumption of other apparatuses connected to the same power breaker from information of the power supply ability of the power breaker.

Additionally, information of FIG. 5 is the flash memory configuration management table which is managed by being automatically acquired from the FM package 30 and registered. Specifically, the CPU 40 in the flash memory control unit 31 stores information of the kind and the number of mounted flash memories in the local RAM 45 at the time of starting up the storage apparatus 10 and at the time of adding or cutting the FM package 30 as described above. Since a register value in the logical circuit 15 is changed at the time of adding or cutting the FM package 30, the logical circuit 15 issues an interrupt signal to the CPU 21. As a result, the CPU 21 can access each FM package 30 to acquire information of the kind and the number of mounted flash memories and register the information as information of FIG. 5. The form of management of information in FIG. 5 is not limited to this, and it is also preferable that information is managed by registering input information from the management terminal 28. Information which is necessary to be managed individually in information of FIG. 2 to FIG. 5 is rated power consumption of flash memories, power supply capacity to the storage apparatus 10, the kind and the number of mounted flash memories by each FM package 30. The manner of managing information is not limited to FIG. 2 to FIG. 5, and it is sufficient that the power supply capacity to the storage apparatus 10, power consumption at portion where the power is always used and power consumption of portions of flash memories by each kind are managed.

Figure 11:
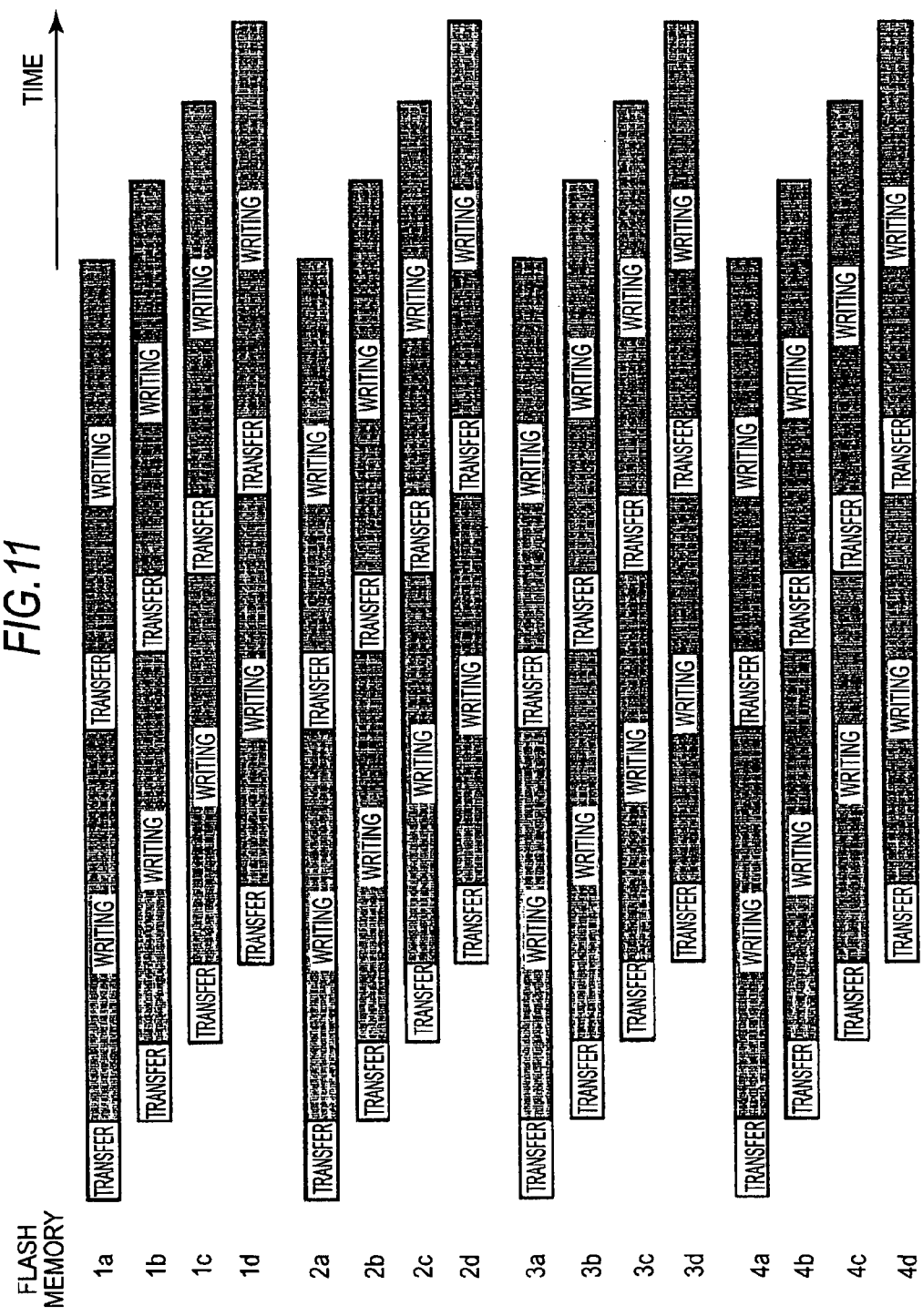
FIG. 11 is a view showing an example of normal write processing in the FM package.

In FIG. 11, write processing with respect to sixteen flash memories 1*a* to 4*d* included in the FM package 30 when power supply is sufficient will be explained, taking time lapse in the horizontal axis. In this case, assume that a page of the flash memory to be a target of write access has been erased. The flash memory control unit 31 transfers an address of the page to be the access target to the flash memory as a write target at the time of write access. Subsequently, the flash memory control unit 31 transfers write data of one page (for example, 2K byte) to a register in the flash memory of the write target by one byte by controlling a write enable signal. The flash memory control unit 31 further transfers a write-operation start command, and the flash memory which has received the write data and the write-operation start command writes the write data in the register into the memory. During writing of write data into the memory area, the ready/busy signal is in the busy state (for example, Low level), and when the writing is completed, the ready/busy signal returns to the ready state (for example, High level). This will be an interrupt signal to the flash memory control unit 31, and the flash memory control unit 31 can detect the completion of the write access to the target flash memory. In the transfer of write data, the flash memories 1*a*, 1*b*, 1*c* and 1*d* share the bus 33, therefore, the flash memory control unit 31 is not able to transfer write data to two or more flash memories connected to the bus 33 at the same time. Concerning the next write operation, the bus is not occupied after the command is issued, therefore, it is possible to perform processing at plural flash memories connected to the same bus at the same time. The flash memories 2*a* to 2*d* are connected to the flash memory control unit 31 by the bus 34, which do not share the bus with the flash memories 1*a* to 1*d*. Accordingly, write transfer to the flash memories 1*a* to 1*d* and write transfer to the flash memories 2*a* to 2*d* can be processed in parallel. It is the same in the flash memories 3*a* to 3*d* connected by the bus 35 and flash memories 4*a* to 4*d* connected by the bus 36. In view of the circumstances, processing is generally performed at timing as shown in FIG. 11 in order to complete write processing as earlier as possible.

Figure 12:
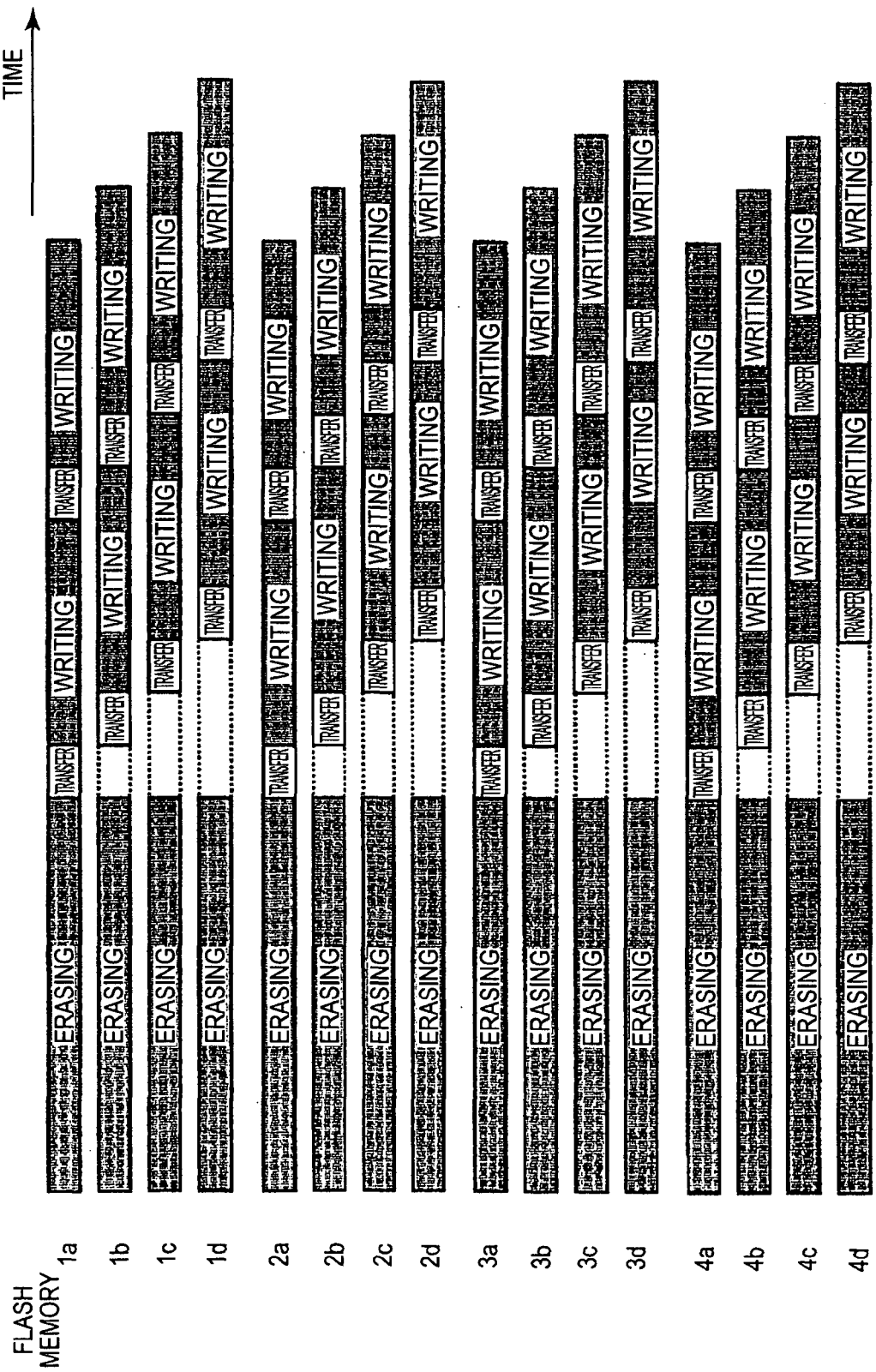
FIG. 12 is a view showing an example of normal write processing with erase operation in the FM package.

In FIG. 12, write processing with respect to sixteen flash memories 1*a* to 4*d* included in the FM package 30 when power supply is sufficient will be explained. In this case, a page of the flash memory to be a target of write access has not been erased. Assume that other effective page data belonging to the same block is escaped in the buffer 41 in advance. Since it is necessary that the page to be write-accessed has been surely erased, the flash memory control unit 31 issues an erase command to respective flash memories in order. The erase operation can be performed at respective flash memories in parallel, and the ready/busy signal is in the busy state (for example, Low level) during erase operation. When the erase operation is completed, the ready/busy signal returns to the ready state (for example, High level). This will be an interrupt signal to the flash memory control unit 31, and the flash memory control unit 31 can detect the completion of the erase operation to the target flash memory. After erasure of respective blocks is completed, the flash memory control unit 31 can execute write processing by the same processing as the explanation in FIG. 11.

Figure 13:
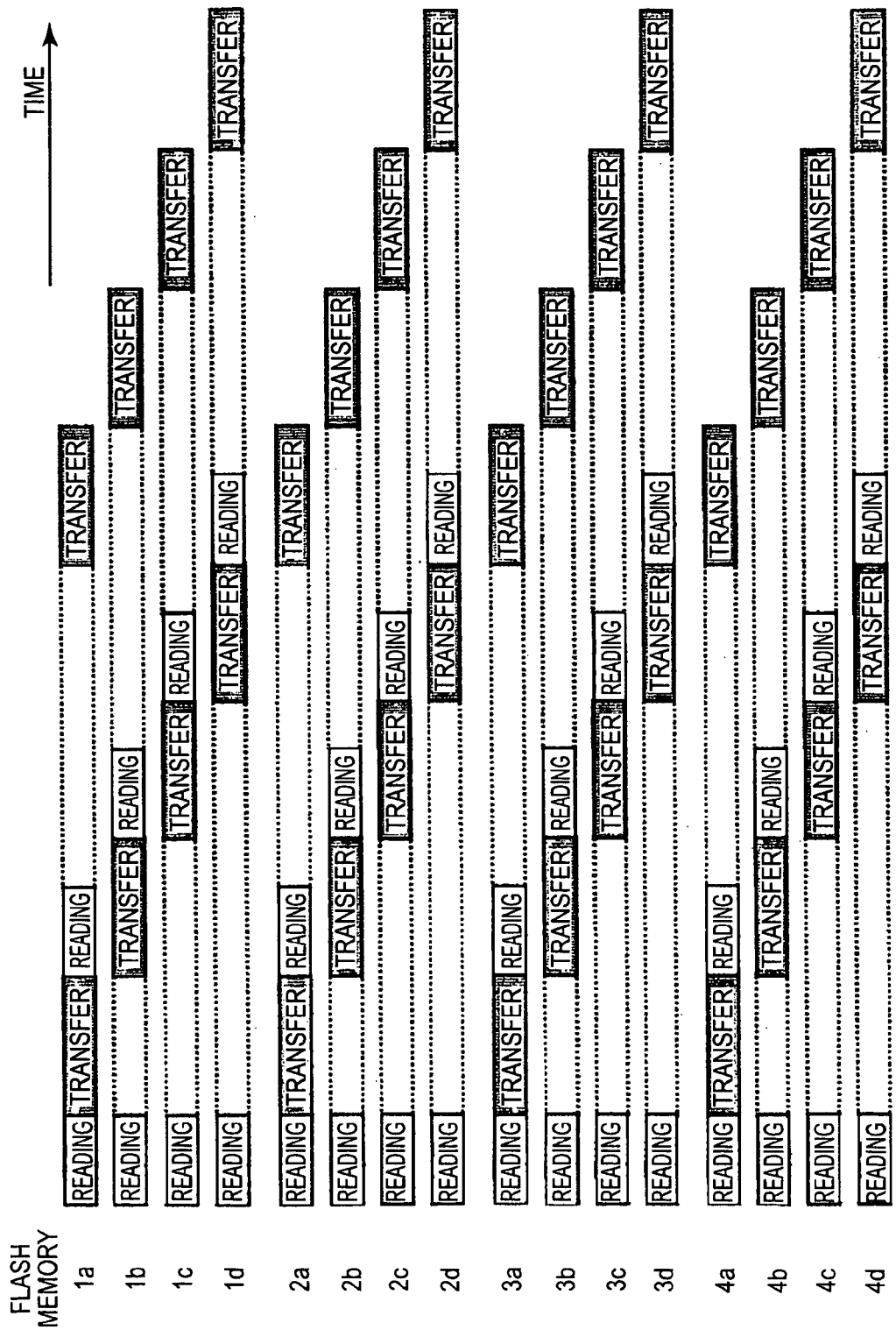
FIG. 13 is a view showing an example of normal read processing in the FM package.

In FIG. 13, read processing with respect to sixteen flash memories included in the FM package 30 will be explained, taking time lapse in the horizontal axis. The flash memory control unit 31 transfers an address of a page to be accessed to a flash memory to be a read target at the time of read access. Subsequently, when the flash memory control unit 31 transfers a read command, the target flash memory reads read data of one page (for example, 2K byte) from a memory area which is the access target to a register in the flash memory. Meanwhile, the ready/busy signal is in the busy state (for example, Low level), and when the reading to the register is completed, the ready/busy signal returns to the ready state (for example, High level). This will be an interrupt signal to the flash memory control unit 31, and the flash memory control unit 31 can detect the completion of preparing for transferring read data. Subsequently, the flash memory control unit 31 reads read data in the register by one byte by controlling a read enable signal, which will be stored in the buffer 41 in the flash memory control unit 31.

Concerning the reading operation to the register, the bus is not occupied after the reading command is issued, therefore, it is possible to perform processing at plural flash memories connected to the same bus at the same time. Since the flash memories 1a, 1b, 1c and 1d share the bus 33, the flash memory control unit 31 is not able to transfer read data from two or more flash memories connected to the bus 33 at the same time. However, according to the command transfer with respect to the flash memory to which the read transfer is completed, it is possible to process the read data transfer from another flash memory on the same bus in parallel with the processing of reading the next page data to the register. The flash memories 2a to 2d are connected to the flash memory control unit 31 by the bus 34 and do not share the bus with the flash memories 1a to 1d. Therefore, it is possible to perform processing of read transfer to the flash memories 1a to 1d and read transfer to the flash memories 2a to 2d in parallel. It is the same in the flash memories 3a to 3d connected by the bus 35 and flash memories 4a to 4d connected by the bus 36. In view of the circumstances, processing is generally performed at timing as shown in FIG. 13 in order to complete read processing as earlier as possible.

Generally, at the initial introduction of the storage apparatus, the environment in which sufficient power is supplied to control flash memories mounted on the storage apparatus is secured. However, when the FM package 30 is added to the media chassis 12 because accumulated data is increased with the operation of the storage apparatus, or because the alternate block area is insufficient, which is assigned when the number of erasing the block of the flash memory comes to the end of its life, the necessary power is increased, therefore, it is assumed a case in which the power to be supplied to the storage apparatus is insufficient. When the power supply capacity is insufficient with respect to the power which is necessary for the storage apparatus, supply voltage to the storage apparatus will be dropped. As a result, power supply voltage supplied to the flash memories may be dropped or shut off. When the drop or shutoff of power supply voltage occurs during write operation with respect to the flash memory, there is a danger that damage or disappearance of data occurs. Generally, in a NAND flash memory, power consumption when write operation, erase operation and read transfer are performed becomes largest. Accordingly, in the application, the number of flash memories which can be processed in one FM package 30 at the same time (hereinafter, referred to as the number of parallel-processable flash memories) is calculated and the control based on the number is performed. In this case, "processing" represents write operation, erase operation or read transfer, which is the same in the following description.

A method of calculating the number of parallel-processable flash memories in the whole storage apparatus 10 will be explained with reference to FIG. 14. The processing is executed at least any one of an occasion when the storage apparatus 10 is started up or an occasion when the CPU detects the addition or cutoff of the FM package 30 to or from the media chassis 12. When the hardware configuration of the storage apparatus 10 is not changed, the number of parallel-processable flash memories with respect to the whole apparatus is not also changed, therefore, after the number of parallel-processable flash memories is calculated at the time described above, it is not necessary that the number of parallel-processable flash memories with respect to the whole apparatus is calculated by each access from the host computer 80. The CPU 21 transmits a command to each FM package 30 and the flash memory control unit 31 sends the kind and the number of mounted flash memories (S101). The CPU 21 updates the flash memory configuration management table of FIG. 5 based on the information (S102). Subsequently, the CPU 21 calculates the number of parallel-processable flash memories in the storage apparatus based on information of FIG. 2, FIG. 3 and FIG. 4 (S103). Specifically, the following calculation formula is executed.

> The number of parallel-process flash memories=
> (power supply capacity (from FIG. 4)−system
> controller unit power consumption (from FIG.
> 3)−media chassis power consumption (from FIG.
> 3)−power consumption of the flash memory control unit and others (from FIG. 2)×the number of
> FM packages)÷power consumption of flash
> memories (from FIG. 2)

The calculated number of parallel-processable flash memories is stored on the local memory 22.

When there are plural kinds of flash memories in the storage apparatus 10, the number of parallel-processable flash memories is calculated according to the kinds of flash memories. For example, when there are two kinds of flash memories A and B, the following formulas are calculated and the calculated number will be stored on the local memory 22.

> The maximum number of parallel-processable flash
> memories A=(power supply capacity (from FIG.
> 4)−system controller unit power consumption
> (from FIG. 3)−media chassis power consumption
> (from FIG. 3)−power consumption of the flash
> memory control unit and others (from FIG.
> 2)×the number of FM packages)÷power consumption of the flash memory A   (formula 1)

> The maximum number of parallel-processable flash
> memories B=(power supply capacity (from FIG.
> 4)−system controller unit power consumption
> (from FIG. 3)−media chassis power consumption
> (from FIG. 3)−power consumption of the flash
> memory control unit and others (from FIG.
> 2)×the number of FM packages)÷power consumption of the flash memory B   (formula 2)

Figure 14:
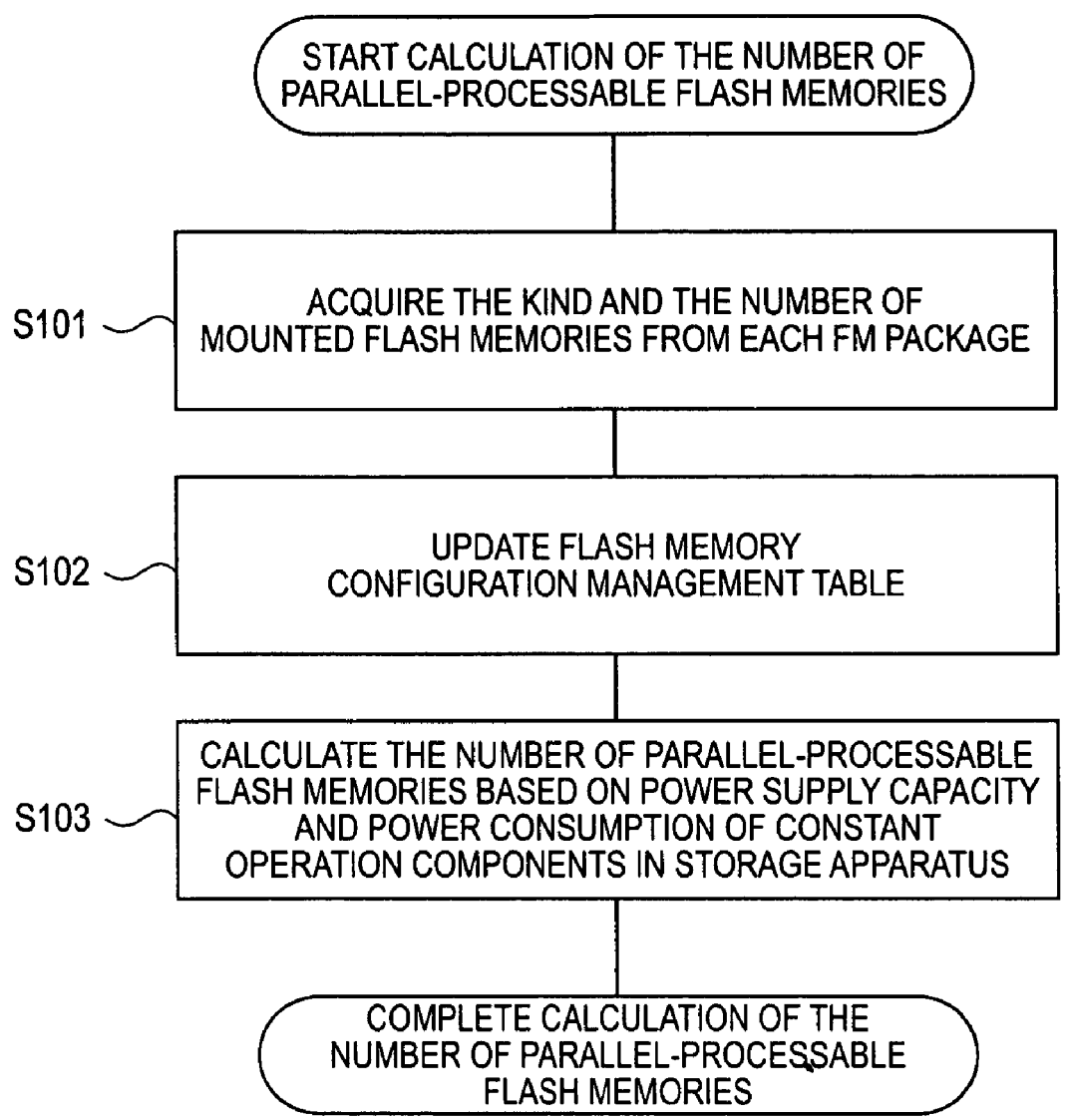
FIG. 14 an example of an operation flow in which the number of parallel-processable flash memories in the storage apparatus is calculated.

The timing of performing calculation processing of the number of parallel-processable flash memories of the whole storage apparatus 10 shown in FIG. 14 is not limited to the timing as described above, and it is also preferable to perform calculation by each input or output request from the host computer 80.

Figure 15:
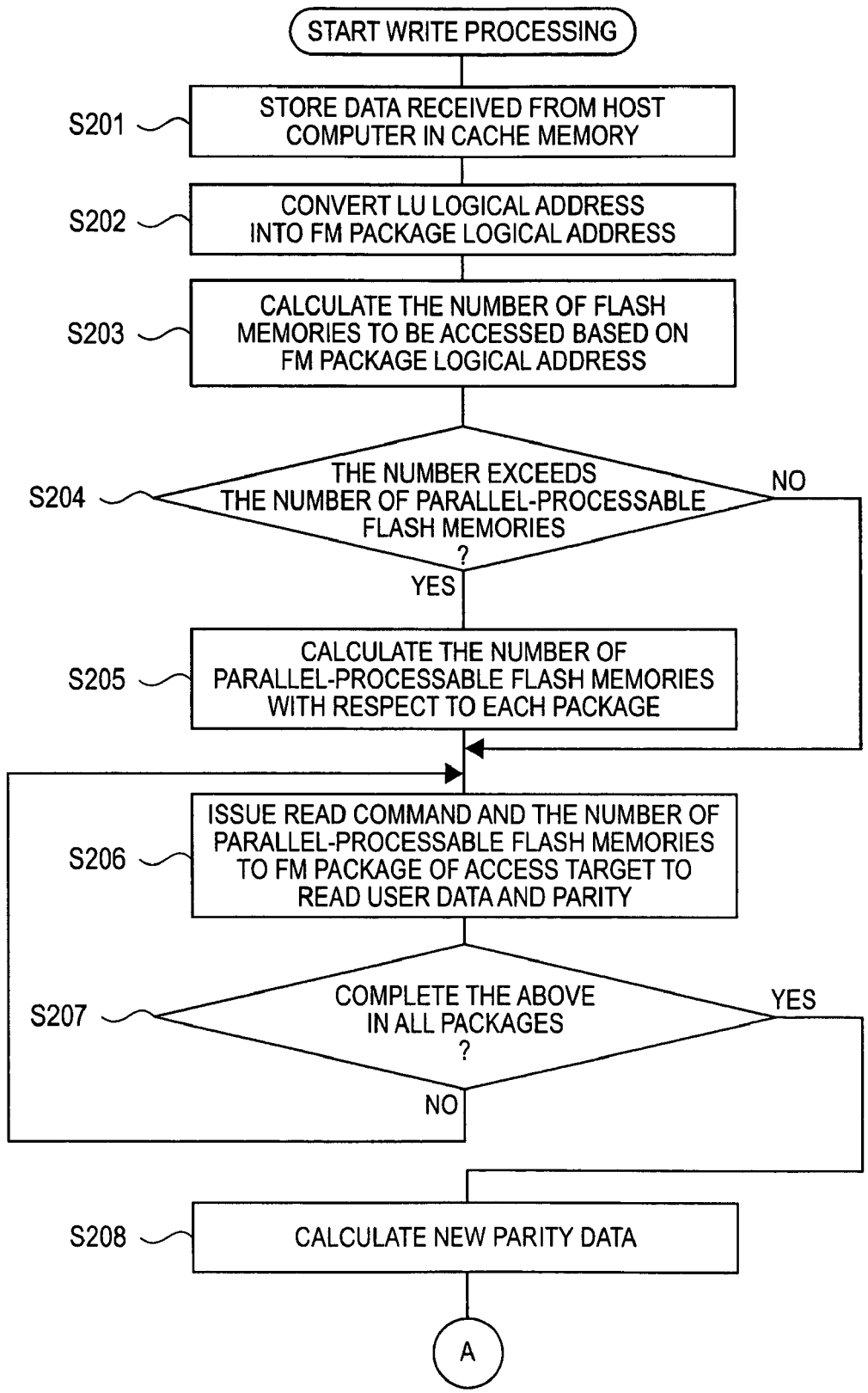
FIG. 15 is an example of an operation flow of a CPU 21 concerning write processing.
Figure 16:
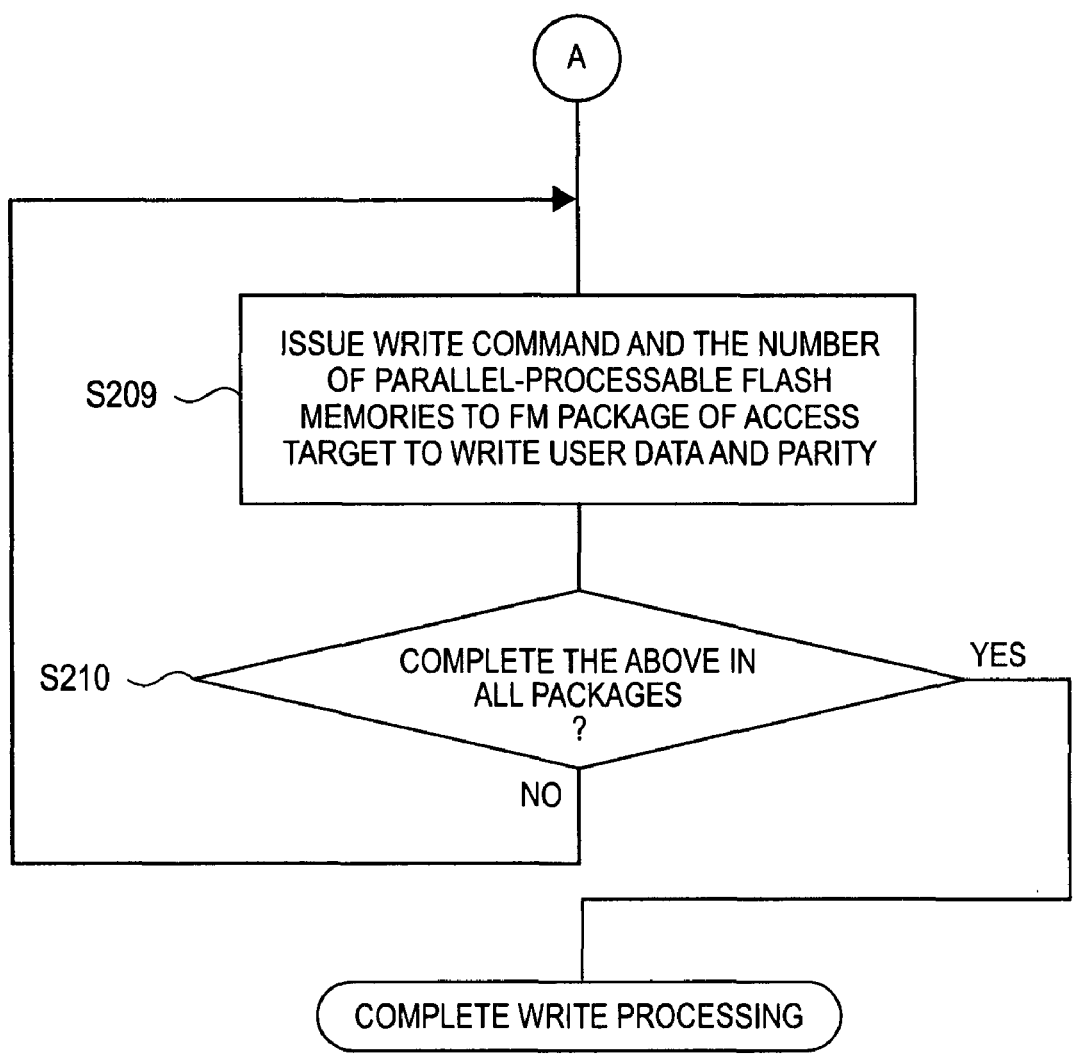
FIG. 16 is an example of the operation flow of the CPU 21 concerning write processing (continuation)

Hereinafter, an operation flow of the CPU 21 when the host computer 80 performs write processing with respect to the storage apparatus 10 will be explained with reference to FIG. 15 and FIG. 16. When receiving write data from the host computer 80, the CPU 21 stores the write data in the cache memory 25 (S201). Next, a LU number and a LU logical address of received write data are converted into a data storage FM package number, a data storage FM package logical address, a parity storage FM package number and a parity storage FM package logical address which will be a target of write access by the RAID level 5 by referring to the LU logical address conversion table of FIG. 17 (S202). Subsequently, the CPU 21 issues a command to the FM package 30 to be an access target to read the FM package logical address conversion table shown in FIG. 10 to the local memory 22, calculating the number of flash memories to be accessed (S203). In the case that the number of flash memories accessed in the storage apparatus 10 obtained as the above exceeds the number of parallel-processable flash memories calculated as the above (S204), the number of parallel-processable flash memories with respect to each FM package 30 in the present access based on the flash memory configuration management table of FIG. 5 (S205) is calculated using the following formula.

> The number of parallel-processable flash memories of the *FM* package #1=the number of flash memories which are accessed in the *FM* package #1×the number of parallel-processable flash memories in the storage apparatus 10÷the number of flash memories which are accessed in the storage apparatus 10

When the number is indivisible as a result of calculation, it is made to be an integer by rounding down.

When there are two kinds of flash memories A and B in the storage apparatus 10, the number of parallel-processable flash memories used at the determination of S204 is calculated by the following formulas.

> The number of parallel-processable flash memories *A*=the maximum number of parallel-processable flash memories *A* (formula 1)×the number of flash memories *A* which are accessed in the storage apparatus 10÷the number of flash memories which are accessed in the storage apparatus 10

> The number of parallel-processable flash memories *B*=the maximum number of parallel-processable flash memories *B* (formula 2)×the number of flash memories *B* which are accessed in the storage apparatus 10÷the number of flash memories which are accessed in the storage apparatus 10

Further, the following formulas are used.

> The number of parallel-processable flash memories of the *FM* package #1 mounting the flash memories *A*=the number of flash memories which are accessed in the *FM* package #1×the number of parallel-processable flash memories *A* in the storage apparatus 10÷the number of flash memories *A* which are accessed in the storage apparatus 10

> The number of parallel-processable flash memories of the *FM* package #2 mounting the flash memories *B*=the number of flash memories which are accessed in the *FM* package #2×the number of parallel-processable flash memories *B* in the storage apparatus 10÷the number of flash memories *B* which are accessed in the storage apparatus 10.

According to the above method, the number of parallel-processable flash memories in proportion to the number of flash memories which are accessed in each FM package 30 is assigned. The number of parallel-processable flash memories is smaller than the number of flash memories which are accessed, thereby the number of parallel processing is suppressed and overhead occurs, however, it is possible to suppress the concentration of overhead to a specific FM package 30, as a result, overhead in the whole storage apparatus 10 can be suppressed to the minimum.

The method of calculating the parallel-processable flash memories in the FM package 30 is not limited to the above. For example, according to the number of flash memories mounted on the FM package 30, calculation may be performed by the following formula.

> The number of parallel-processable flash memories of the *FM* package #1=the number of flash memories mounted on the *FM* package #1×the number of parallel-processable flash memories in the storage apparatus 10÷the number of flash memories which are accessed in the storage apparatus 10

Concerning write access to the RAID group of the RAID level 5, it is necessary that, after user data and parity data in the FM package 30 are read and new parity data is calculated, the new parity data is written in the FM package 30 with write data according to write penalty. In the case that either the number of flash memories to be accessed does not exceed the number of parallel-processable flash memories calculated as the above in S204, or after the number of parallel-processable flash memories with respect to each FM package 30 is calculated in S205, the CPU 21 issues a read command and the calculated number of parallel-processable flash memories when S205 has been processed with respect to the FM package 30 to be accessed, reading user data and the parity data of the access destination in the cache memory 25 (S206).

Figure 18:
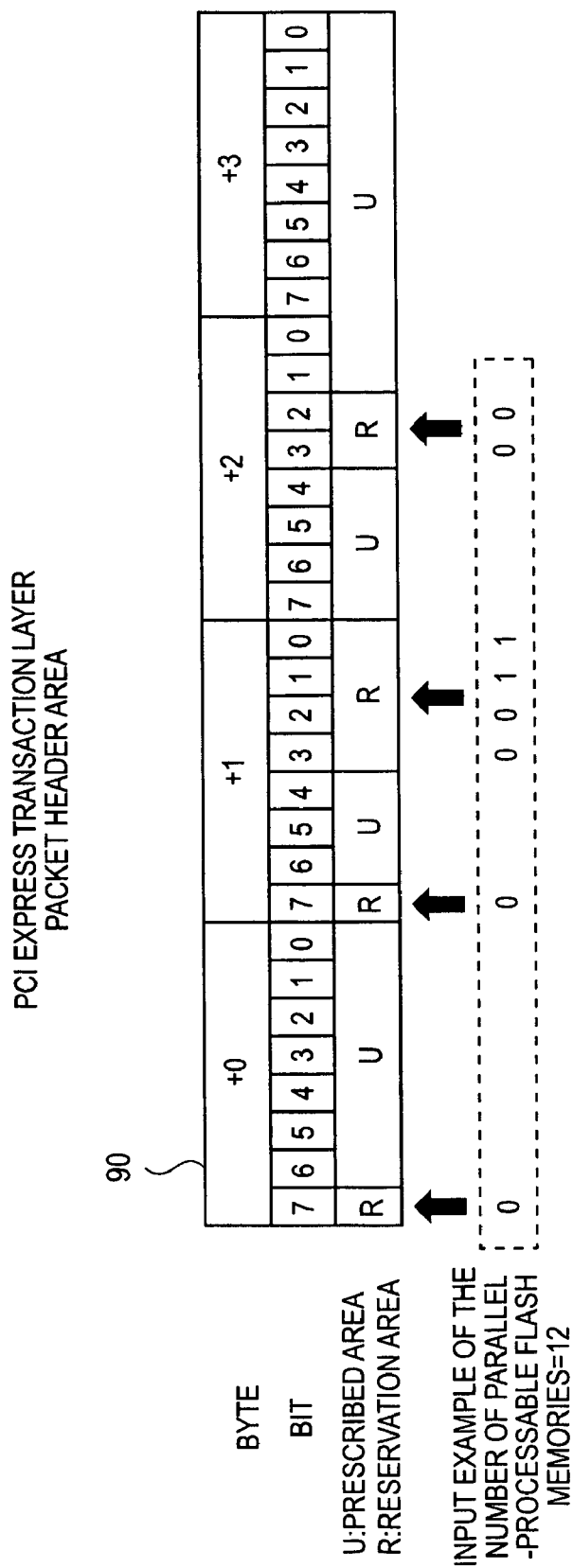
FIG. 18 is a chart showing an example of a designation method of the number of parallel-processable flash memories in the FM package.

In FIG. 18, an example of a designation method of the number of parallel-processable flash memories in the FM package 30 according to the PCI Express protocol is shown. 90 denotes a packet header area of a transaction layer in the PCI Express standard. The packet header area 90 has 4-byte, and areas denoted by "U" represent areas applications of which are prescribed by the standard, and areas denoted by "R" represent reservation areas applications of which are not prescribed by the standard. In order to designate 12 as the number of parallel-processable flash memories, the number is inputted in the reservation area in binary digits so as to be aligned right. When it is not necessary to designate the number of parallel-processable flash memories, "0" is inputted to all bits of the reservation area. Accordingly, the write command or the read command and the number of parallel-processable flash memories can be transmitted to the FM package 30 by issuing the command once, therefore, the performance as the storage apparatus 10 does not deteriorate.

After S206 is repeated to all the FM packages 30 to be accessed (S207), new parity data is calculated from user data and parity data of the access destination in the cache memory 25 and write data from the host computer 80 (S208). After that, the CPU 21 issues a write command to the FM package 30 to be accessed and the calculated number of parallel-processable flash memories when S205 has been processed, writing the write data on the cache memory 25 and the new parity data in the FM package 30 (S209).

Further, S209 will be repeated for all FM packages 30 to be accessed (S209).

In the embodiment, the example of the designation method of the number of parallel-processable flash memories is shown in the case of the PCI Express interface, however, even when the FM package 30 has other interfaces, that is, FC, SAS or SATA interface, the number of parallel-processable flash memories is assigned to the reservation areas in the data block transmitted to the FM package 30 at the time of issuing the command, thereby transmitting the write command or the read command and the number of parallel-processable flash memories by one-time command.

Figure 19:
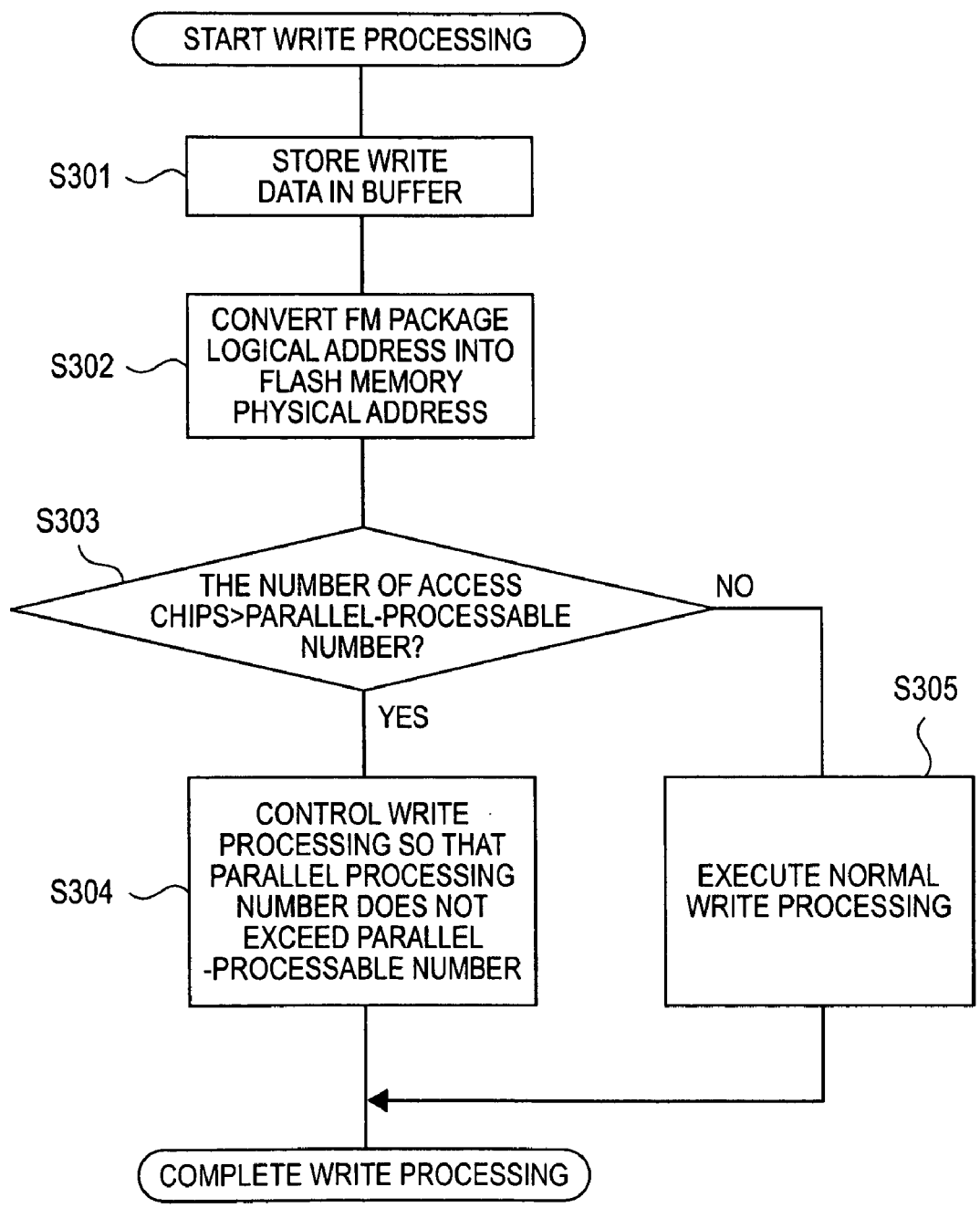
FIG. 19 is an example of an operation flow of the flash memory control unit concerning write processing.

Hereinafter, an operation flow of the flash memory control unit 31 in the FM package 30 when the write command is received from the CPU 21 with the number of parallel-processable flash memories is shown in FIG. 19. The flash memory control unit 31 stores write data received with the write command from the CPU 21 of the system controller unit 11 in the buffer 41 (S301). Subsequently, the flash memory control unit 31 converts a FM package logical address to be the write target designated by the write command into a flash memory physical address, namely, a flash memory number, a page address in the flash memory and a physical address in the page based on the FM package logical address conversion table on the local RAM 45 (S302). When the number of flash memories to which the received write data performs access exceeds the number of parallel-processable flash memories in the FM package 30 (S303), write processing is performed so that the number of parallel-process flash memories does not exceed the number of parallel-processable flash memories (S304). When the number of flash memories to which the received write data performs access does not exceed the number of parallel-processable flash memories in the FM package 30 (S303), normal write processing is performed (S305).

Figure 20:
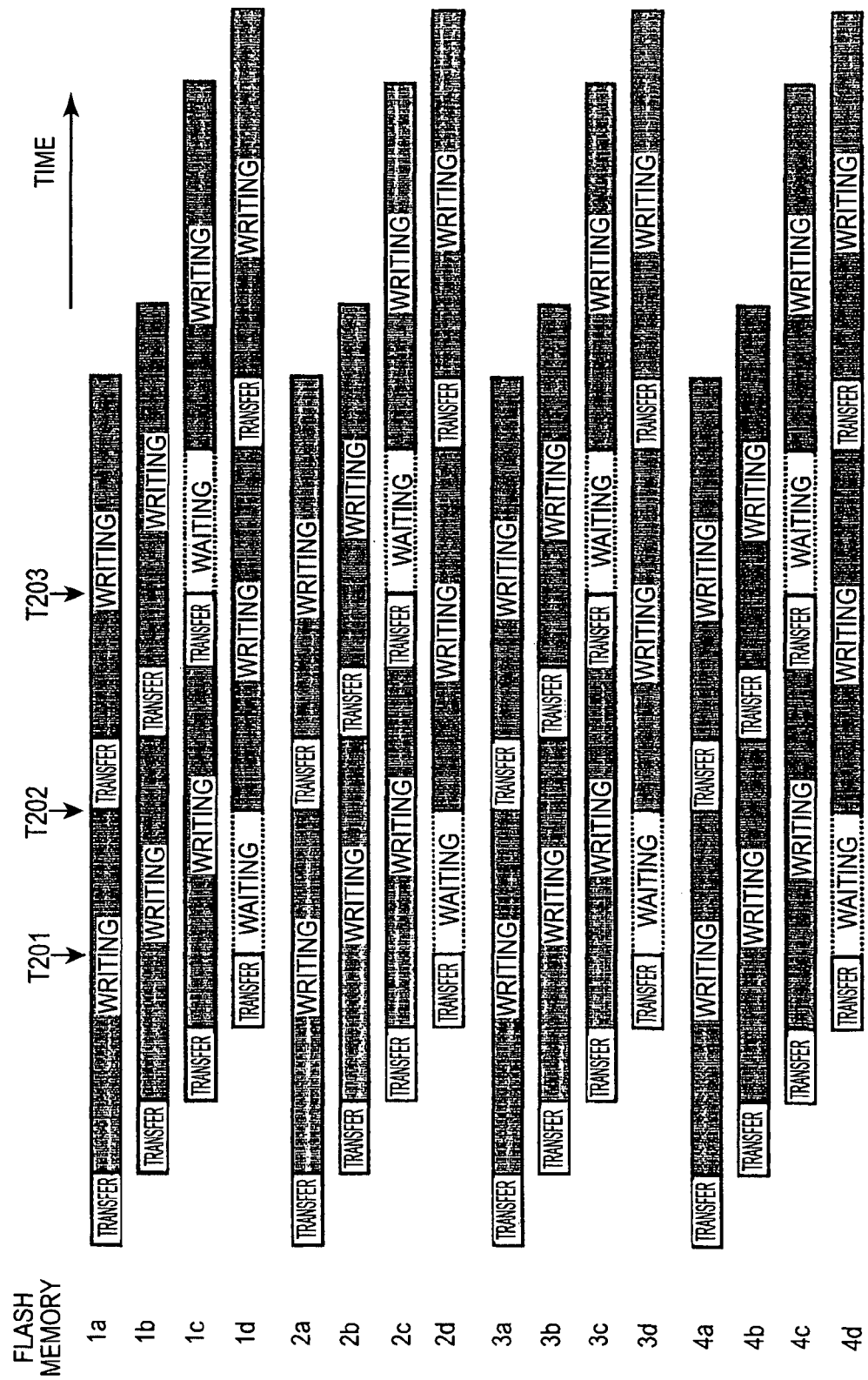
FIG. 20 is a view showing an example of write processing in the FM package based on the number of parallel-processable flash memories.

Hereinafter, an example of write processing (S304) without erase operation which is performed so that the number of the parallel-process flash memories does not exceed the number of parallel-processable flash memories is explained with reference to FIG. 20. In the embodiment, a flow of transfer control to respective flash memories when the FM package 30 including sixteen flash memories receives 12 as the number of parallel-processable flash memories with the write command from the CPU 21 is shown. With respect to flash memories 1a to 1c, 2a to 2c, 3a to 3c and 4a to 4c, the write-operation start command is issued after the write transfer is finished to start write operation as in the case shown in FIG. 11, however, a write-operation start command is not transferred with respect to flash memories 1d, 2d, 3d and 4d to make them to wait (T201) because, just after the write transfer has been completed, the flash memories 1a to 1c, 2a to 2c, 3a to 3c and 4a to 4c are during write operation and the number of parallel processing is already 12. When the ready/busy signal of the flash memory 1a returns from the busy state to the ready state to thereby complete write operation, write operation of the flash memory 1d becomes possible, therefore, the transfer control unit 42 transfers a write-operation start command with respect to the flash memory 1d (T202). It is the same in the flash memories 2d, 3d and 4d. In T203, flash memories 1d, 1a, and 1b are during write operation, therefore, write operation of the flash memory 1c is not started and the memory is made to wait. The above processing is repeated to thereby suppress the number of flash memories performing write operation at the same time to twelve at the maximum at any time. Naturally, which flash memory is instructed to wait is not limited to the example shown in FIG. 20.

Generally, in order to suppress the number of flash memories to be processed in parallel to the number of parallel-processable flash memories as well as to suppress overhead, write processing may be performed in the following principle. (1) when flash memories as the write access target exist in two or more buses, one flash memory is selected from each bus and transfer of write data is performed in parallel. (2) when the number of the flash memories to be write-accessed is two or more larger than the number of parallel-processable flash memories, flash memories which are made to wait for writing operation are selected from different buses as much as possible.

Figure 21:
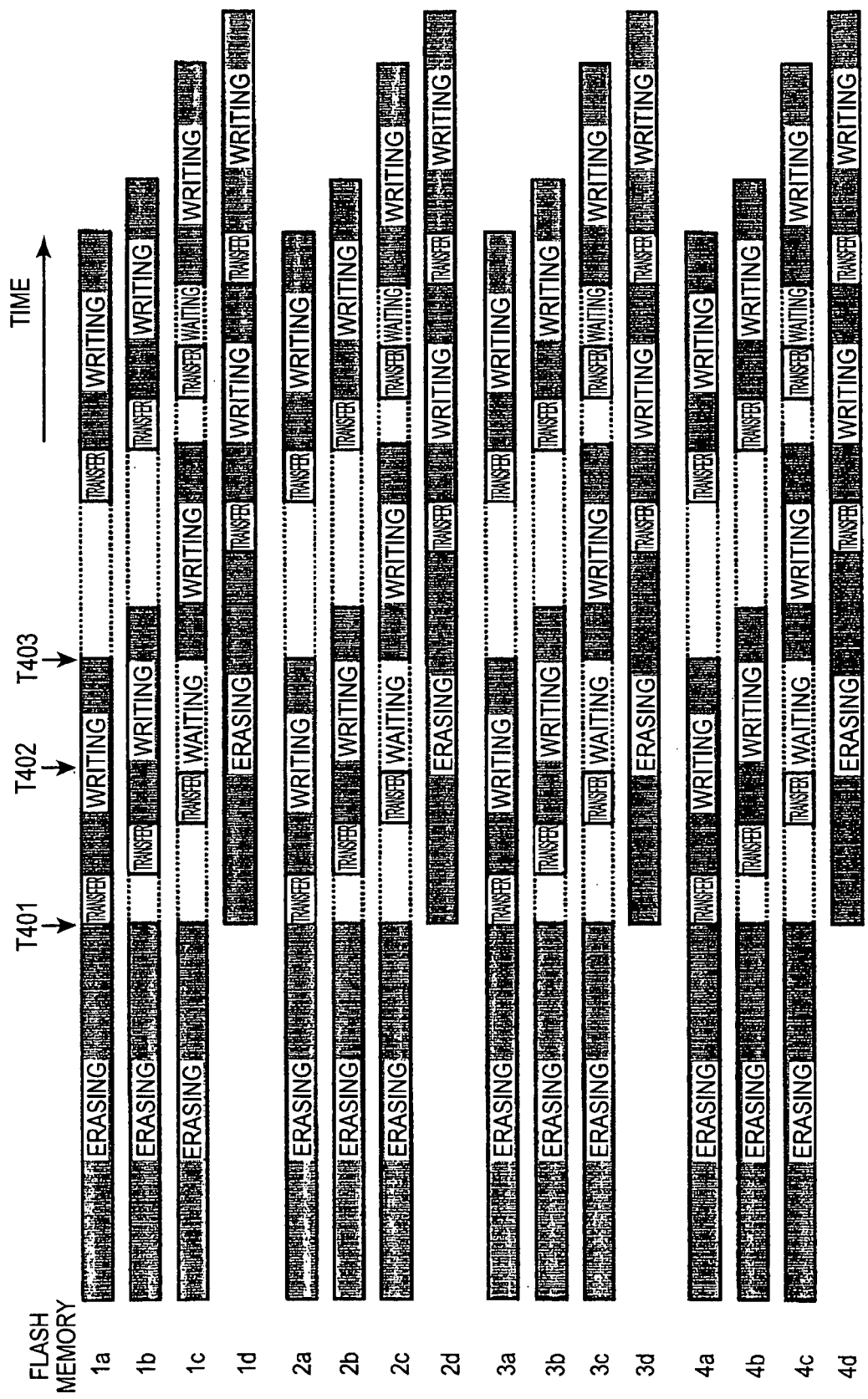
FIG. 21 is a view showing an example of write processing with erase operation in the FM package based on the number of parallel-processable flash memories.

Hereinafter, an example of write processing (S304) with erase -operation which is performed so that the number the parallel-process flash memories does not exceed the number of parallel-processable flash memories is explained with reference to FIG. 21. In the embodiment, a flow of write processing with respect to sixteen flash memories 1a to 4d when the FM package 30 including sixteen flash memories receives 12 as the number of parallel-processable flash memories with the write command from the CPU 21 is shown. Note that other effective page data belonging to the same block as the page to be accessed is escaped to the buffer 41 in advance. First, an erase command is issued to flash memories 1a to 1c, 2a to 2c, 3a to 3c and 4a to 4c to perform erase operation in parallel. When the erase operation of any one of flash memories 1a to 1c is completed, an erase command is issued to the flash memory 1d to thereby start erase operation (T401). Subsequently, write transfer is performed with respect to flash memories 1a to 1c. It is the same in flash memories 2a to 2c, 3a to 3c and 4a to 4c. At the point when transfer of write data to flash memories 1c, 2c, 3c and 4c has been finished, flash memories 1a, 1b, 2a, 2b, 3a, 3b, 4a, 4b are during write operation and flash memories 1d, 2d, 3d and 4d are during erase operation and the number of parallel processing is already 12, therefore, a write-operation start command is not transferred with respect to flash memories 1c, 2c, 3c and 4c to make them to wait (T402). When the ready/busy signal of the flash memory 1a returns from the busy state to the ready state to thereby complete write operation, write operation of the flash memory 1c becomes possible, therefore, the transfer control unit 42 transfers a write-operation start command with respect to the flash memory 1c (T403). It is the same in flash memories 2c, 3c and 4c. The above processing is repeated to thereby suppress the number of flash memories performing write operation and erase operation at the same time to twelve at the maximum at any time. Naturally, which flash memory is instructed to wait is not limited to the example shown in FIG. 21.

Figure 22:
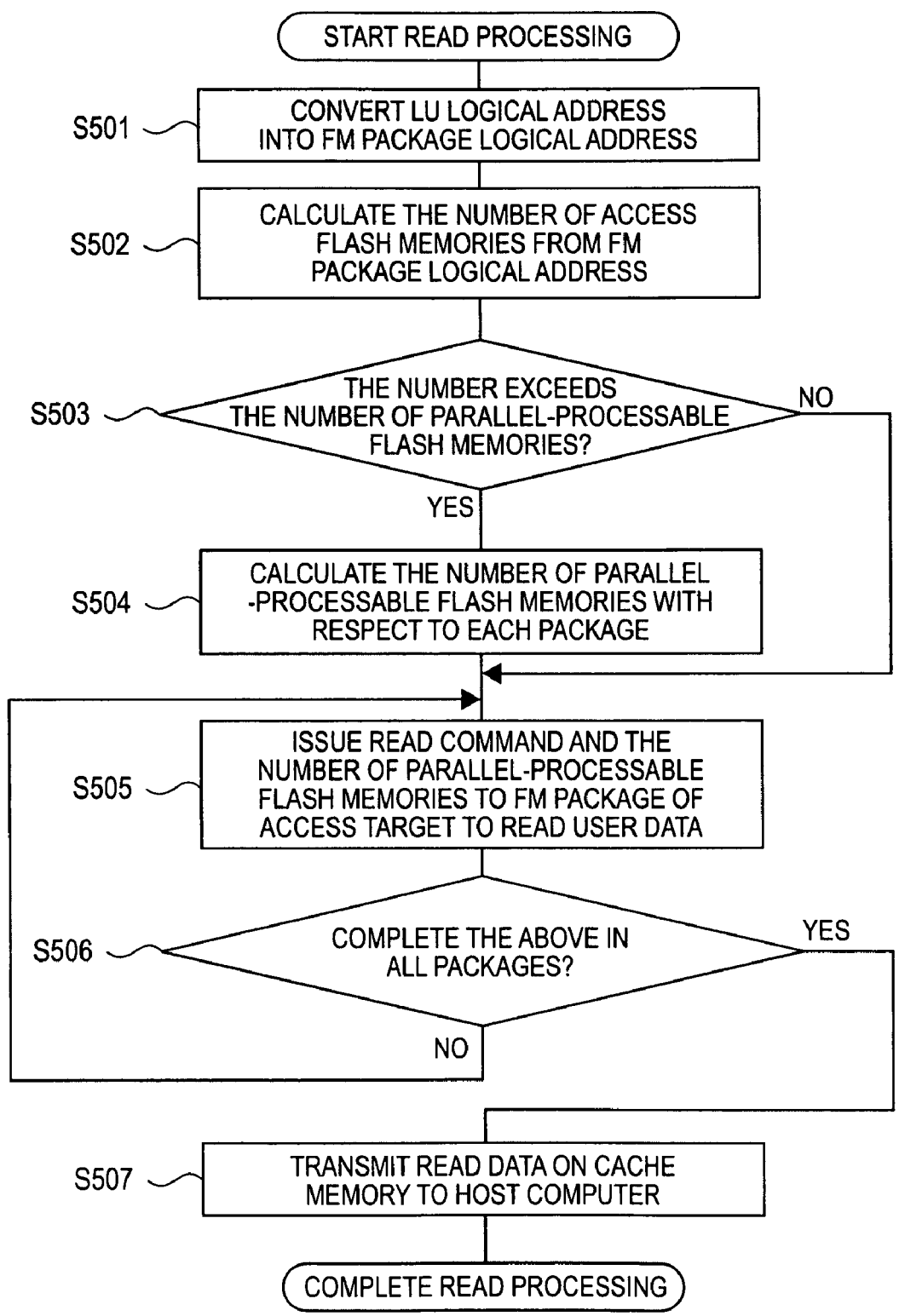
FIG. 22 is an example of an operation flow of the CPU 21 concerning read processing.

Hereinafter, an operation flow of the CPU 21 when the host computer 80 performs read processing with respect to the storage apparatus 10 will be explained with reference to FIG. 22. The CPU 21 converts an LU number and an LU logical address of read data into a data storage FM package number and a data storage FM package logical address to be a read access target by referring to the LU logical address conversion table of FIG. 17 (S501). Next, the CPU 21 issues a command for a FM package 30 to be accessed and reads the FM package logical address conversion table shown in FIG. 10 in the local memory 22 to calculate the number of flash memories to be accessed (S502). When the number of flash memories accessed in the storage apparatus 10 obtained as the above exceeds the number of parallel-processable flash memories calculated as the above (S503), the number of parallel-processable flash memories with respect to each FM package 30 is calculated by the following formulas based on the flash memory configuration management table of FIG. 5 (S504).

> The number of parallel-processable flash memories of the $FM$ package #1=the number of flash memories which are accessed in the $FM$ package #1×the number of parallel-processable flash memories in the storage apparatus 10÷the number of flash memories which are accessed in the storage apparatus 10

When the number is indivisible as a result of calculation, it is made to be an integer by rounding down.

When there are two kinds of flash memories A and B in the storage apparatus 10, the number of parallel-processable flash memories used at the determination of S503 is calculated by the following formulas.

> The number of parallel-processable flash memories $A$=the maximum number of parallel-processable flash memories $A$ (formula 1)×the number of flash memories $A$ which are accessed in the storage apparatus 10÷the number of flash memories which are accessed in the storage apparatus 10

The number of parallel-processable flash memories $B$=the maximum number of parallel-processable flash memories $B$ (formula 2)×the number of flash memories $B$ which are accessed in the storage apparatus 10÷the number of flash memories which are accessed in the storage apparatus 10

Further, the following formulas are used.

The number of parallel-processable flash memories of the FM package #1 mounting the flash memories $A$=the number of flash memories which are accessed in the FM package #1×the number of parallel-processable flash memories $A$ in the storage apparatus 10÷the number of flash memories $A$ which are accessed in the storage apparatus 10

The number of parallel-processable flash memories of the FM package #2 mounting the flash memories $B$=the number of flash memories which are accessed in the FM package #2×the number of parallel-processable flash memories $B$ in the storage apparatus 10÷the number of flash memories $B$ which are accessed in the storage apparatus 10.

According to the above method, the number of parallel-processable flash memories in proportion to the number of flash memories which are accessed in each FM package 30 is assigned. The number of parallel-processable flash memories is smaller than the number of flash memories which are accessed, thereby the number of parallel-processable is suppressed and overhead occurs, however, it is possible to suppress the concentration of overhead to a specific FM package 30, as a result, overhead in the whole storage apparatus 10 can be suppressed to the minimum.

The method of calculating the parallel-processable flash memories in the FM package 30 is not limited to the above. For example, according to the number of flash memories mounted on the FM package 30, calculation maybe performed by the following formula.

The number of parallel-processable flash memories of the FM package #1=the number of flash memories mounted on the FM package #1×the number of parallel-processable flash memories in the storage apparatus 10÷the number of flash memories which are accessed in the storage apparatus 10

In the case that either the number of flash memories to be accessed does not exceed the number of parallel-processable flash memories calculated as the above in S503, or after the number of parallel-processable flash memories with respect to each FM package 30 is calculated in S504, the CPU 21 issues a read command and the calculated number of parallel-processable flash memories when S504 has been processed to the FM package 30 to be accessed, reading user data of the access destination in the cache memory 25 (S505). Further, S505 will be repeated with respect to all the FM packages 30 to be accessed (S506). Lastly, the CPU 21 transmits read data on the cache memory 25 to the host computer 80.

Concerning read processing, power consumption becomes maximum at the time of read transfer. The number of parallel processing of read transfer is four at the maximum as shown in FIG. 13. Therefore, when the number of parallel-processable flash memories is twelve, there is no change in processing. On the other hand, when information indicating that the number of parallel-processable flash memories is three or less in the case shown in FIG. 13 is received, the flash memory control unit 31 sets a waiting state suitably with respect to read transfer.

Figure 23:
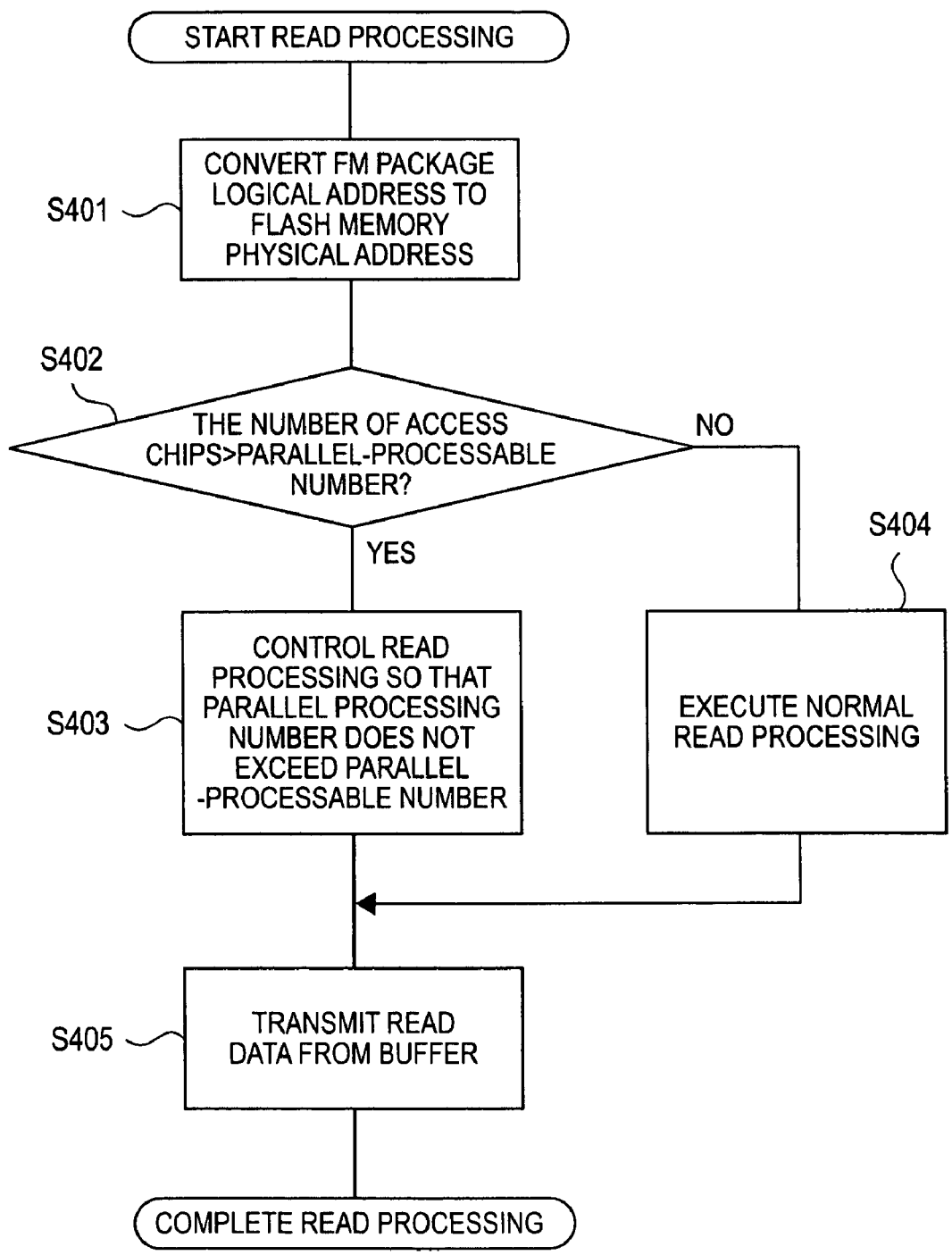
FIG. 23 is an example of an operation flow of the flash memory control unit concerning read processing.

Hereinafter, an operation flow of the flash memory control unit 31 in the FM package 30 when receiving the read command from the CPU 21 with the number of parallel-processable flash memories will be shown in FIG. 23. The flash memory control unit 31 converts a FM package logical address into a flash memory physical address, that is, a flash memory number, a page address in the flash memory and a physical address in the page based on the FM package logical address conversion table on the local RAM 45 (S401). When the number of flash memories to be accessed as read data exceeds the number of parallel-processable flash memories in the FM package 30 (S402), read processing is performed so that the number of parallel-process flash memories does not exceed than the number of parallel-processable flash memories and read data is stored in the buffer 41 (S403). When the number of flash memories to be accessed as read data does not exceed the number of parallel-processable flash memories in the FM package 30 (S402), normal read processing is performed and read data is stored in the buffer 41 (S404). Lastly, the flash memory control unit 31 transmits read data to the system controller unit 11 from the buffer 41 (S405).

Figure 24:
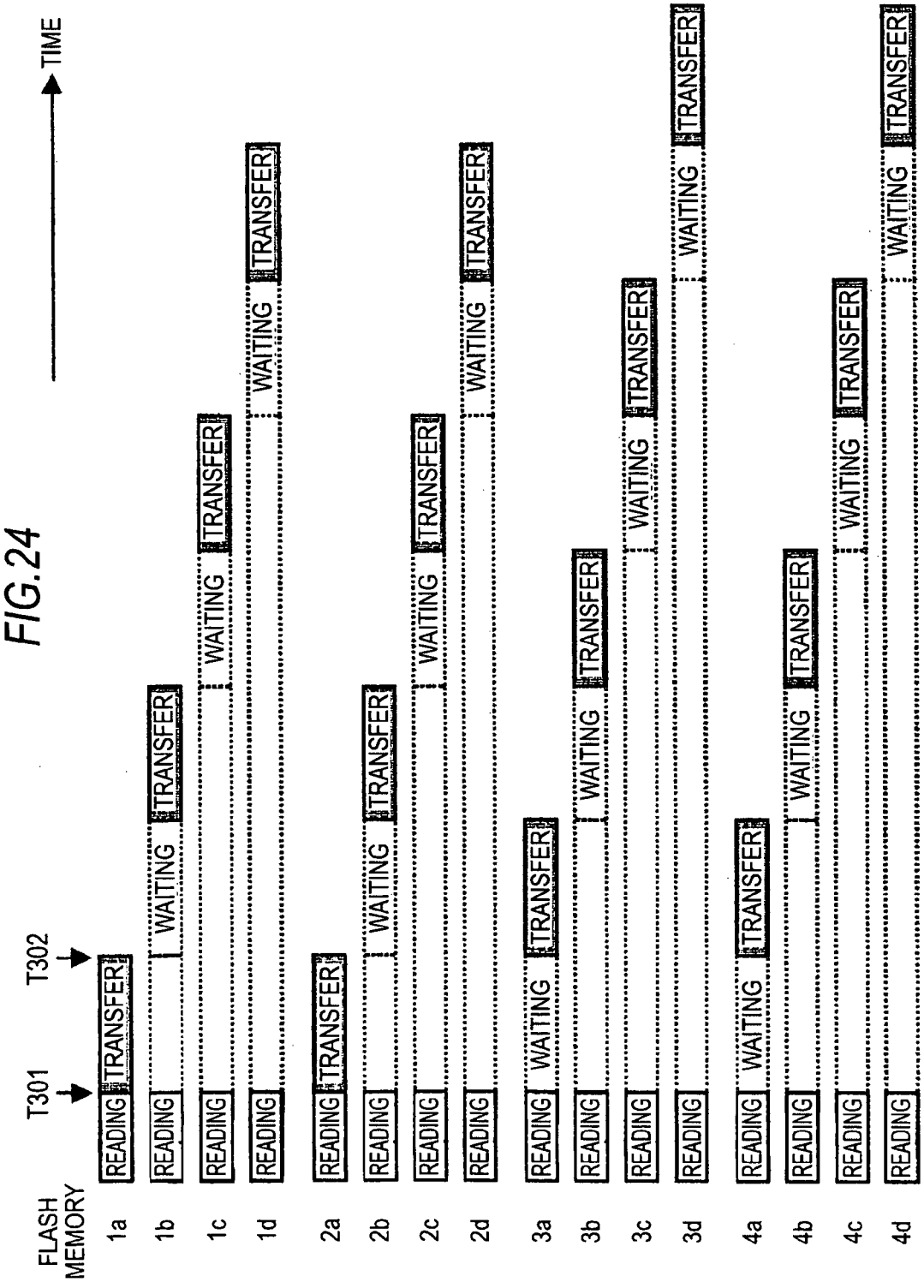
FIG. 24 is a view showing an example of read processing in the FM package based on the number of parallel-processable flash memories.

Hereinafter, an example of read processing (S403) performed so that the number of parallel-process flash memories does not exceed the number of parallel-processable flash memories will be explained with reference to FIG. 24. In the embodiment, a flow of read processing with respect to sixteen flash memories 1a to 4d when the FM package 30 having sixteen flash memories receives 2 as the number of parallel-processable flash memories with a read command from the CPU 21 is shown. The read transfer is started with respect to the flash memories 1a and 2a after the reading has been completed as in the case shown in FIG. 13, however, the number of parallel processing is already 2 at this point, therefore, flash memory selection signals are made to be inactive to thereby make the flash memories 3a and 4a wait (T301). When data transfer of one page from the flash memory 1a is completed, read transfer from the flash memory 3a is possible, therefore, the transfer control unit 42 starts read transfer with respect to the flash memory 3a (T302). It is the same in the flash memories 2a and 4a. The above processing is repeated to thereby suppress the number of flash memories performing read transfer at the same time to two at the maximum at any time. Naturally, which flash memory is instructed to wait is not limited to the example shown in FIG. 24. Generally, in order to suppress the number of flash memories to be processed in parallel to the number of parallel-processable flash memories as well as to suppress overhead, read processing may be performed in the following principle. (1) when flash memories as the read access target exist in two or more buses, one flash memory is selected from each bus and transfer of read data is performed in parallel. (2) when the number of the flash memories to be read-accessed is two or more larger than the number of parallel-processable flash memories, flash memories which are made to wait for read transfer are selected from different buses as much as possible.

According to the above method, the number of flash memories processed in parallel does not exceed the number of parallel-processable flash memories in the whole storage apparatus 10, as a result, the storage apparatus can normally operate within a range of the power supply capacity. Accordingly, in the storage apparatus on which flash memories are mounted as storage media, availability can be maintained even when power supply is insufficient with respect to the maximum rated power consumption of the whole storage apparatus.

What is claimed is:
1. A storage apparatus, comprising:
a plurality of packages each including plural flash memories and a flash memory control unit controlling the plural flash memories; and a storage unit storing information of power supply capacity, and wherein a first parallel-processable number of flash memories that can be processed in parallel in the entire storage apparatus performing writing, erasing or reading in parallel is determined based on the stored information of power supply capacity, wherein, when the flash memories to be access targets of a received write command or a read command to the packages exceed the first parallel-processable number, a second parallel-processable number of flash memories that can be processed in parallel in each package is calculated, wherein the second parallel-processable number is issued with the write command or the read command, wherein the flash memory control unit of a package which received the second parallel-processable number makes any of the plural flash memories wait for the timing of transfer of a write operation start command, read transfer or transfer of an erase command to control so that the flash memories not exceeding the second parallel-processable number operate in parallel, and wherein the second parallel-processable number is calculated on the basis of the first parallel-processable number so that a ratio between the number of flash memories accessed in each package and the number of parallel-processable flash memories of each package is the same as a ratio between the number of flash memories accessed in the storage apparatus and the number of parallel-processable flash memories of the storage apparatus.

2. The storage apparatus according to claim 1, wherein the storage unit stores power consumption at constant operation components in the storage apparatus and power consumption of one of the plural flash memories, and wherein the first parallel-processable number in which flash memories can operate within a range not exceeding the power capacity is calculated based on the information of power supply capacity, information of power consumption at the constant operation components and power consumption of the flash memory.

3. The storage apparatus according to claim 2, wherein power consumption of the flash memory is any one of power consumption at the time of writing, power consumption at the time of erasing and power consumption at the time of reading.

4. The storage apparatus according to claim 1, wherein the storage control unit determines the second parallel-processable number with respect to each access from a host computer connected to the storage apparatus.

5. The storage apparatus according to claim 1, wherein the first parallel-processable number is determined at least on any of an occasion of power application of the storage apparatus and an occasion of adding or cutting removing a package.

6. The storage apparatus according to claim 1, wherein, when different types of flash memories are included in at least two of the plurality of packages, the storage control unit determines the first parallel-processable number with respect to each of the types of flash memories.

7. The storage apparatus according to claim 1, wherein the flash memory control unit selects two or more flash memories connected to different buses in the package when performing transfer of the write operation start command, transfer of the erase command or read transfer to two or more flash memories in parallel, and selects two or more flash memories connected to different buses in the package that received the second parallel-processable number when waiting for transfer of the write operation start command, transfer of the erase command or read transfer with respect to two or more flash memories in parallel.

8. The storage apparatus according to claim 1, wherein the information of power supply capacity is set in advance by a storage management terminal connected to the storage apparatus.

9. The storage apparatus according to claim 1, wherein the flash memory control unit converts a logical address which is a target of the write command or the read command into a physical address.

10. A storage apparatus, comprising:

a plurality of packages each including plural flash memories and a flash memory control unit controlling the plural flash memories; and a storage unit storing information of power supply capacity, and wherein a first parallel-processable number of flash memories that can be processed in parallel in the entire storage apparatus performing writing, erasing or reading in parallel is determined based on the information of power supply capacity, wherein, when the flash memories to be access targets of a received write command or a read command to the packages exceed the first parallel-processable number, a second parallel-processable number of flash memories that can be processed in parallel in each package is calculated, wherein the second parallel-processable number is issued with the write command or the read command, wherein the flash memory control unit of a package which received the second parallel-processable number makes any of the plural flash memories wait for the timing of transfer of a write operation start command, read transfer or transfer of an erase command to control so that the flash memories not exceeding the second parallel-processable number operate in parallel, and wherein the second parallel-processable number is calculated on the basis of the first parallel-processable number so that a ratio between the number of flash memories mounted on each package and the number of parallel-processable flash memories of each package is the same as a ratio between the number of flash memories accessed in the storage apparatus and the number of parallel-processable flash memories of the storage apparatus.

* * * * *